US007455306B2

(12) United States Patent
Ramsey et al.

(10) Patent No.: US 7,455,306 B2
(45) Date of Patent: Nov. 25, 2008

(54) INTEGRAL ARM AXLE/SUSPENSION SYSTEM

(75) Inventors: John Edward Ramsey, Canton, OH (US); Jeffrey R Wittlinger, Clarksville, TN (US)

(73) Assignee: Hendrickson USA, L.L.C., Itsaca, IL (US)

( * ) Notice: Subject to any disclaimer, the term of this patent is extended or adjusted under 35 U.S.C. 154(b) by 123 days.

(21) Appl. No.: 11/684,250

(22) Filed: Mar. 9, 2007

(65) Prior Publication Data

US 2007/0145705 A1    Jun. 28, 2007

Related U.S. Application Data

(63) Continuation-in-part of application No. 10/966,273, filed on Oct. 15, 2004, now abandoned.

(60) Provisional application No. 60/554,729, filed on Mar. 19, 2004, provisional application No. 60/512,328, filed on Oct. 17, 2003.

(51) Int. Cl.
*B60G 3/10* (2006.01)
*B60G 3/12* (2006.01)

(52) U.S. Cl. ................... 280/124.128; 280/124.131; 267/41; 267/160

(58) Field of Classification Search .......... 280/124.117, 280/124.128, 124.131, 124.132, 124.133, 280/124.153, 124.163, 124.17; 267/36.1, 267/41, 47, 160
See application file for complete search history.

(56) References Cited

FOREIGN PATENT DOCUMENTS

| EP | 0650860 B1 | 8/1997 |
|----|------------|--------|
| WO | 8600854 | 2/1986 |
| WO | 2004088073 A1 | 10/2004 |

OTHER PUBLICATIONS

DaimlerChrysler brochure entitled "New DCA Trailer Axle System," published in Germany. Date of publication of brochure is uncertain. System believed to be known to the public as of about Apr. 2003.

*Primary Examiner*—Christopher Ellis
*Assistant Examiner*—Joseph Rocca
(74) *Attorney, Agent, or Firm*—Krugliak, Wilkins, Griffiths & Doughert Co., L.P.A.; David P. Dureska; Edward T. Kennedy

(57) ABSTRACT

An axle/suspension system for a wheeled vehicle, in which the vehicle has a frame, includes an integral arm structure that includes an attachment member for connecting the integral arm structure to the vehicle frame. A flexible transition member is connected to and extends from the attachment member and a body is connected to and extends from the transition member The flexible transition member may be generally curved or angular and enables pivotal movement of the integral arm structure and cooperates with the body to distribute forces encountered by the axle/suspension system The body may be a truss structure or a solid body, which may include a member that replaces a conventional axle tube. Optionally, two axle/suspension integral arm structures may be used to capture a conventional axle tube.

21 Claims, 22 Drawing Sheets

INTEGRAL ARM AXLE/SUSPENSION SYSTEM

CROSS-REFERENCE TO RELATED APPLICATIONS

This application is a continuation-in-part of U.S patent application Ser. No. 10/966,273, filed on Oct. 15, 2004, which claims the benefit of U.S. Provisional Application Ser. No. 60/512,328, filed on Oct. 17, 2003, and U.S. Provisional Application Ser. No 60/554,729, filed on Mar. 19, 2004.

BACKGROUND OF THE INVENTION

1. Field of the Invention

The present invention relates to the art of axle/suspension systems for vehicles. More particularly, the invention relates to the art of trailing and leading arm air-ride axle/suspension systems for heavy-duty vehicles, such as tractor-trailers or semi-trailers, which cushion the vehicle ride for occupants and cargo and stabilize the vehicle during operation.

2. Background Art

Heavy-duty vehicles, such as tractor-trailers or semi-trailers and dump trucks, typically include one or more leading or trailing arm air-ride suspension systems that connect the frame of the vehicle to the wheel-bearing axles of the vehicle. Each pair of leading or trailing arm suspension assemblies that are connected to a respective axle is known in the art as an axle/suspension system and acts to cushion the ride and stabilize the vehicle. That is, as the vehicle is traveling over-the-road, its wheels encounter road conditions that impart various forces, loads and/or stresses, collectively referred to herein as forces, to the respective axle on which the wheels are mounted, and in turn, to the suspension assemblies that are connected to and support the axle. In order to minimize the detrimental effect of these forces on the vehicle as it is operating, the axle/suspension system is designed to absorb at least some of them.

These forces include vertical forces caused by vertical movement of the wheels as they encounter certain road conditions, fore-aft forces caused by acceleration and deceleration of the vehicle, and side-load and roll forces associated with transverse vehicle movement, such as turning of the vehicle and lane-change maneuvers. In order to absorb such disparate forces, axle/suspension systems have differing structural requirements. More particularly, a dampening of vertical forces leads to a desire to have an axle/suspension system structure that is relatively flexible. In contrast, fore-aft forces and roll forces lead to a desire to have an axle/suspension system that is fairly rigid to minimize the amount of sway experienced by the vehicle and thus provide stability. Moreover, the rigidity of an axle/suspension system must be offset or tempered by some degree of roll compliance to prevent failure of components in the system.

In the prior art, these competing demands have led to air-ride axle/suspension systems with many separate components. While such prior art systems include shock absorbers and air springs to dampen vertical movement of the vehicle, many other components are necessary. For example, hangers are attached to the vehicle frame, leading or trailing arm beams ate pivotally connected to the hangers at one beam end and are welded to the axle at the other beam end. Rubber pivot bushings that are softer in the vertical direction than in the fore-aft horizontal direction are typically used to connect the leading or trailing arm beams to the hangers. These bushings, known in the art as TRI-FUNCTIONAL® bushings, which is a registered trademark owned by Hendrickson USA, L.L.C., the assignee of the present invention, exhibit compliance so that a certain degree of roll can be maintained, while the other components of the system remain relatively rigid and non-compliant.

Other prior art axle/suspension systems include components such as trailing arm beam weldments that are bolted onto axle seats with a pair of pins. Rubber bushings are used in the axle seats and in pivot joints that connect the trailing arms to the vehicle frame to provide roll compliance. Still other axle/suspension systems include trailing arm beams that are stiff leaf springs, which rigidly attach to the axle and pivotally mount with bushing assemblies to the vehicle frame. The leaf springs provide roll compliance for these systems.

The integral nature of the axle in these prior art axle/suspension systems requires it to function as a large anti-roll bar, vertical and fore-aft beaming structure, and side load support structure. Such a concentration of forces on the axle increases the chance of failure of the rigid connection between leading or trailing suspension beams and the axle, as well as of the axle itself In addition, the use of multiple specialized components in these prior art axle/suspension systems leads to a significant amount of expense involved in the time, labor, and equipment needed to manufacture and assemble the system Moreover, these additional components add to the complexity of the axle/suspension system, increasing the possibility of failure of joined components and creating the possibility of their frequent repair or replacement. Furthermore, the use of limited flexible components in the prior art, such as bushings, isolates certain forces in the bushings, which may create stress risers in them that decrease their useful life.

As a result, a need has existed in the art to develop an axle/suspension system that overcomes the disadvantages of the prior art and provides an axle/suspension system that has an improved structure, is lighter in weight and, as a result, distributes forces using fewer components. These disadvantages are overcome by the present invention through the use of an integral arm axle/suspension system that distributes forces and eliminates the hangers, bushings, and conventional leading or trailing arm beams, as well as the axle tube of prior art axle/suspension systems in certain embodiments.

BRIEF SUMMARY OF THE INVENTION

An objective of the present invention is to provide an axle/suspension system that reduces the number of components needed, and exhibits improved distribution of forces.

Another objective of the present invention is to provide an axle/suspension system that is lighter in weight than prior art axle/suspension systems.

A further objective of the present invention is to provide an axle/suspension system that optionally eliminates the need for an axle tube, or at least more efficiently distributes the forces imposed on an axle tube.

Still another objective of the present invention is to provide an axle/suspension system that is economical to manufacture and durable in use.

These objectives and advantages are obtained by the axle/suspension system of the present invention, the general nature of which may be stated as including an axle/suspension system integral arm structure that includes an attachment member for connecting the integral arm structure to a frame of the vehicle. A flexible transition member is connected to and extends from the attachment member and a body is connected to and extends from the transition member. The transition member enables pivotal movement of the integral arm structure and cooperates with the body to distribute forces encountered by the axle/suspension system.

BRIEF DESCRIPTION OF THE SEVERAL VIEWS OF THE DRAWINGS

The preferred embodiments of the invention, illustrative of the best modes in which applicant has contemplated applying the principles of the invention, are set forth in the following description and are shown in the drawings, and are particularly and distinctly pointed out and set forth in the appended claims.

Similar numerals refer to similar parts throughout the drawings.

DETAILED DESCRIPTION OF THE INVENTION

Figure 1:
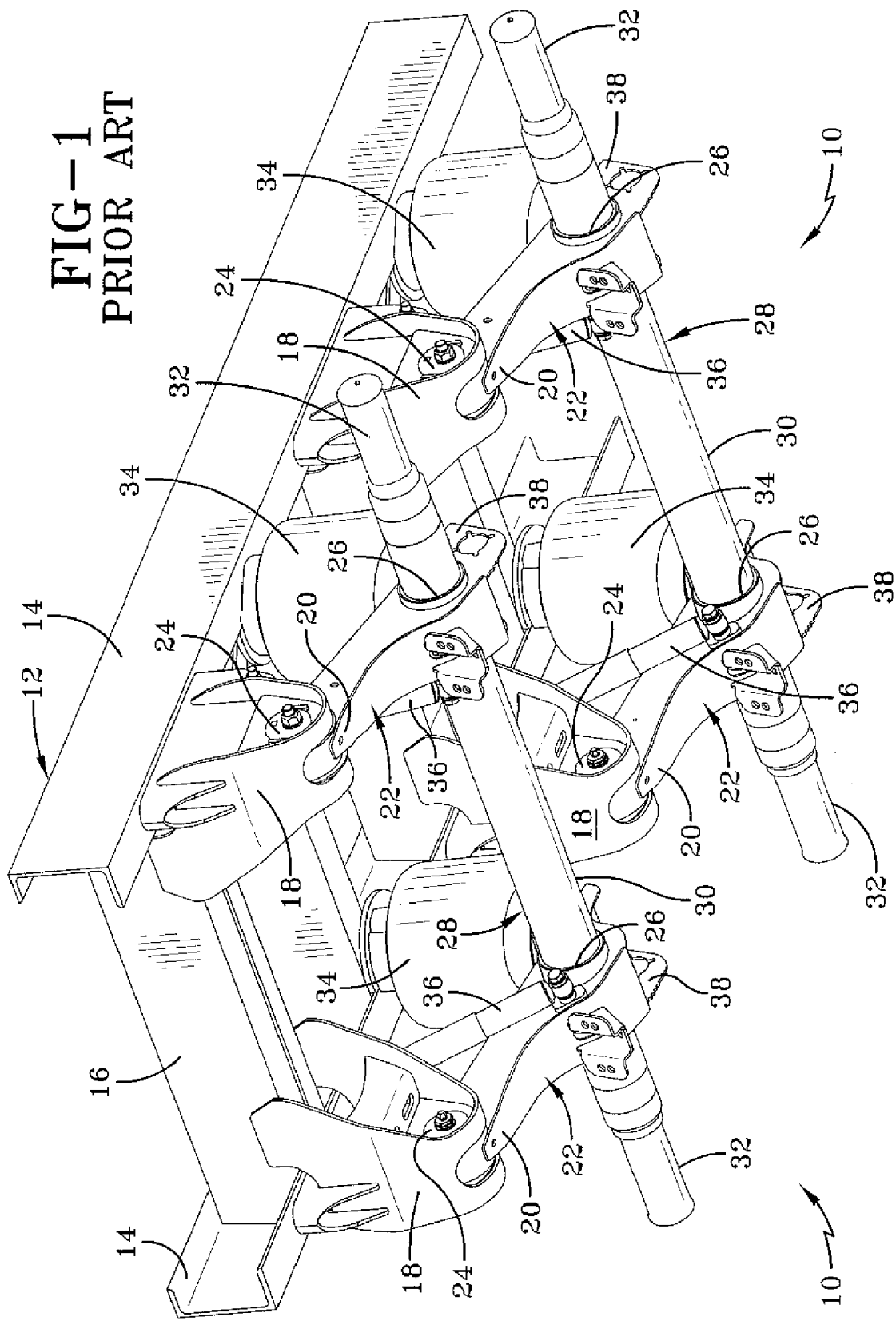
FIG. 1 is a bottom front perspective view of a portion of a frame of a heavy-duty vehicle, shown supporting a pair of prior art trailing-arm axle/suspension systems.

So that the present invention may be best understood, a representative prior art axle/suspension system now will be described. A pair of prior art air-ride trailing arm type axle/suspension systems 10 are shown in FIG. 1 mounted on a vehicle frame 12. Vehicle frame 12 includes a pair of longitudinally-extending, spaced-parallel elongated main members 14. Vehicle frame 12 also includes a plurality of spaced parallel cross members 16, which extend transversely between and are attached to main members 14 Since each of prior art axle/suspension systems 10 is identical to the other, only one will be described in detail herein.

Prior art axle/suspension system 10 includes a pair of transversely spaced hangers 18 that are mounted on and depend from main members 14 and selected ones of cross members 16 of vehicle frame 12. A first end 20 of each one of a pair of transversely-spaced trailing arm beams 22 is pivotally connected to a corresponding hanger 18 with a rubber pivot bushing assembly 24. Bushing assembly 24 includes pivot bolts, washers and TRI-FUNCTIONAL® bushings, which are bushings that are softer in the vertical direction than the fore-aft horizontal direction. For the purpose of simplicity, pivot bushing assembly 24 and pivot bushing 24 will interchangeably be referred to herein. A beam-axle interface 26 of each trailing arm beam 22 is welded or otherwise rigidly affixed to a transversely-extending axle 28, thereby capturing the axle in the beams. Axle 28 includes a central tube 30 that is generally located between trailing arm beams 22 and a pail of spindle ends 32, each of which is located outboardly from a respective one of the beams.

Prior art axle/suspension system 10 also includes air springs 34 and shock absorbers 36. Each air spring 34 extends between and is mounted on a second end 38 of a respective one of beams 22 and a respective one of main frame members 14. Each shock absorber 36 extends between and is mounted on a respective one of beams 22 near axle interface 26 and a corresponding hanger 18.

Prior art axle/suspension system 10 thus includes many separate components, including hangers 18, beams 22, bushings 24 and axle 28, which lead to a significant amount of expense involved in time, labor, and equipment needed to manufacture and assemble the system. This complexity of prior art axle/suspension system 10 increases the possibility of failure of joined components. Furthermore, prior art axle/suspension system 10 requires axle 28 to function as a large anti-roll bar, vertical and fore-aft beaming structure, and side load support structure. Such a concentration of forces on axle 28 also increases the chance of failure of the rigid connection between trailing arm beams 22 and axle 28, as well as of the axle itself. Moreover, the use of bushings 24 as the primary flexible component of prior art system 10 concentrates certain forces in the bushings that decrease their useful life.

As a result, a need has existed in the art to develop an axle/suspension system that overcomes the disadvantages of the prior art and provides an axle/suspension system with fewer components and improved force distribution.

Turning now to the drawings of the present invention, wherein the illustrations are for showing preferred embodiments of the invention, and not for limiting the same, FIGS. 2-5 show a first exemplary embodiment of an integral axle/suspension system, indicated generally at 40. Integral axle/suspension system 40 replaces hangers 18, beams 22, bushings 24 and axle central tube 30 of prior art axle/suspension system 10 shown in FIG. 1, and like components of other similar prior art axle/suspension systems.

First embodiment air-ride axle/suspension system 40, shown attached to a vehicle frame 12, includes an integral arm structure 42, driver side axle spindle 44 and curb side axle spindle 46. Axle/suspension system 40 also includes air springs 34 and shock absorbers (not shown). Integral arm structure 42 is an integral, one-piece structure that eliminates many separate components found in prior art axle/suspension system 10, including central tube 30 of axle 28, beams 22, bushing assemblies 24, and hangers 18. Replacement of these prior art components with a single integral arm structure 42 promotes better distribution of forces during vehicle operation, as well as other advantages which will be described hereinbelow. Components of a vehicle brake system 48, while not part of axle/suspension system 40, are preferably mounted to integral arm structure 42 and are shown for the sake of completeness.

Figure 2:
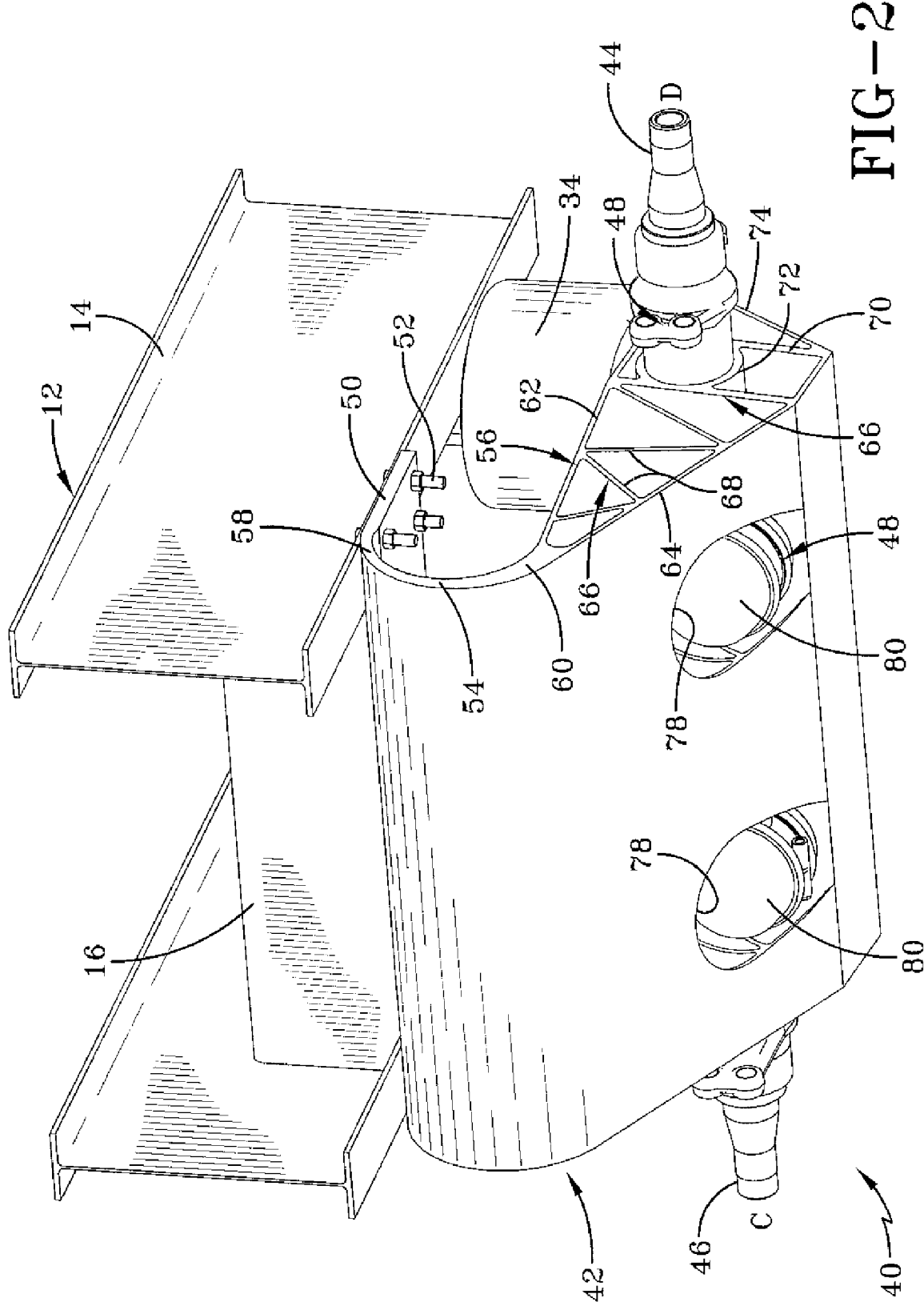
FIG. 2 is a bottom front perspective view of a first exemplary embodiment of the integral axle/suspension system of the present invention attached to a portion of a frame of a heavy-duty vehicle, with shock absorbers removed but including a brake system.
Figure 3:
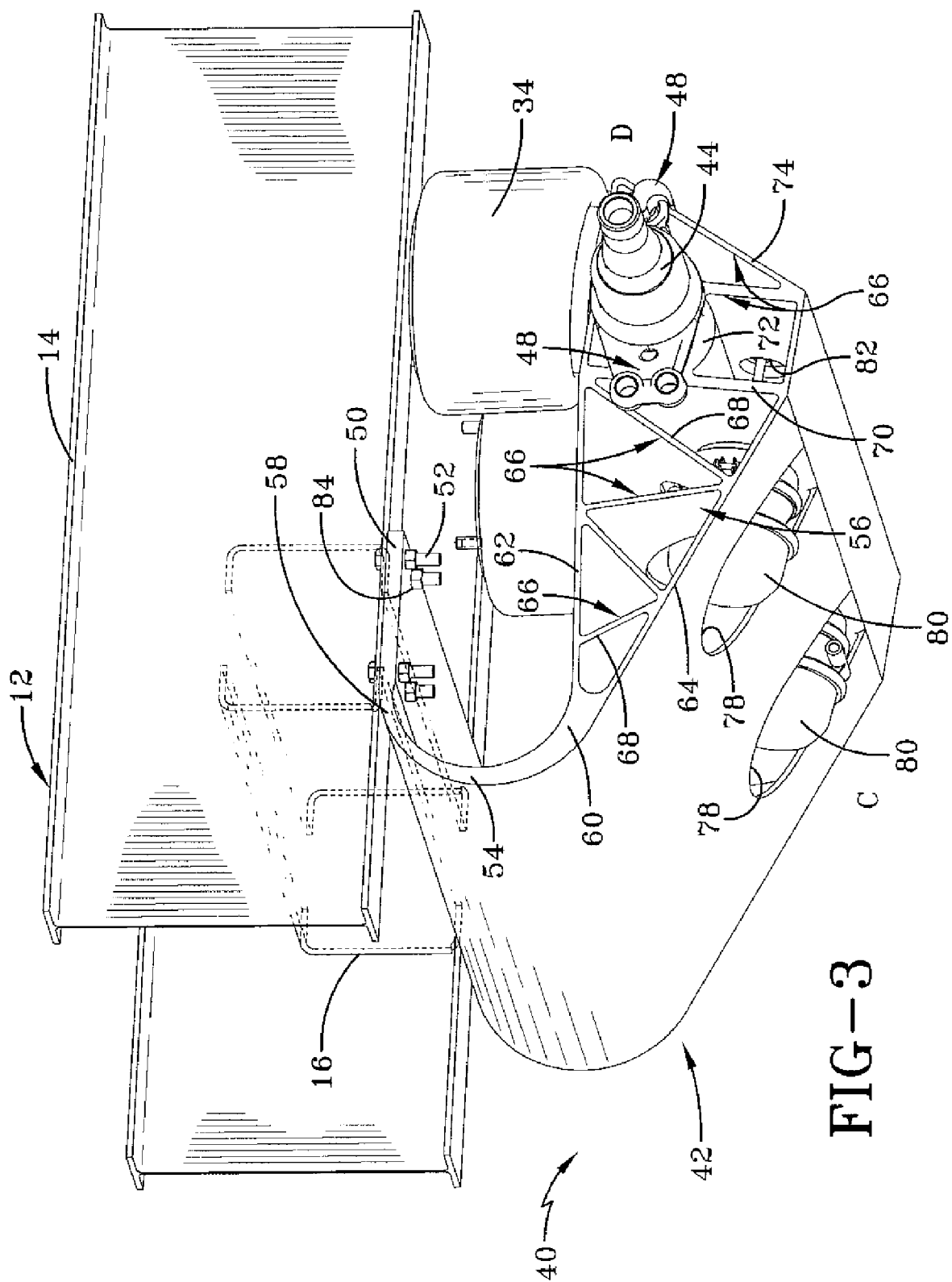
FIG. 3 is a side perspective view of the structure shown in FIG. 2, with hidden portions of a cross member of the vehicle frame represented by dashed lines.

With particular reference to FIGS. 2 and 3, axle/suspension system integral arm structure 42 extends substantially across the width of vehicle frame 12, from driver side D to curb side C, on which axle/suspension system 40 is installed. Axle/suspension system integral arm structure 42 includes a generally continuous, transversely-extending cross section which provides for the aforementioned distribution of forces as well as ease of manufacturing. Integral arm structure 42 includes an upper plate 50, having a thickness $t_1$ (FIG. 5), and which preferably acts as an attachment member to connect the axle/suspension system integral arm structure directly to main members 12 and selected cross members 16 of vehicle frame 12 with bolts 52 or other fastening means known in the art. Alternatively, other structural members (not shown) may be interposed between upper plate 50 and vehicle filename 12, such as spacers, shims, mounting members and the like.

From upper plate 50, a curved transition member 54 of axle/suspension system integral arm structure 42 curves frontwardly downward and then rearwardly downward to a body 56, which is a truss structure. Curved transition member 54 is shown in first embodiment axle/suspension system 40 as C-shaped and includes a cross-sectional geometry that allows the transition member to flex while remaining structurally stable, enabling integral arm structure 42 to articulate in a pivotal-like motion during vehicle operation. Preferably, curved transition member 54 includes a portion 58 having a thickness $t_2$ that is less than thickness $t_1$ of upper plate 50 to encourage articulation of integral arm structure 42. This simplified structure of present invention axle/suspension system 40 is in contrast to prior art system 10, which utilizes bushing assemblies 24, frame hangers 18 and beams 22 to achieve such pivotal movement. At a point 60, as curved transition member 54 approaches truss structure 56, the thickness of the transition member preferably increases to a maximum dimension $t_3$, which is greater than upper plate thickness $t_1$ to provide increased structural support.

Truss structure 56 includes a generally horizontal, rearwardly-extending top truss plate 62 and a downwardly-angled, rearwardly-extending bottom truss plate 64. Extending between and integrally formed with top truss plate 62 and bottom truss plate 64 are individual truss members 66. Truss members 66 are adjusted in form and orientation to suit the particular requirements of axle/suspension system 40, such as anticipated load conditions for a certain type of vehicle. For example, individual truss members 66 preferably include angular truss members 68, a rectangular truss member 70, a cylindrical truss member 72 and a rear truss member 74. Angular truss members 68 extend between top truss plate 62 and bottom truss plate 64 at various angles relative to the top and bottom truss plates beginning near curved transition member 54, continuing rearwardly to rectangular truss member 70, in which cylindrical truss member 72 is formed.

Figure 4:
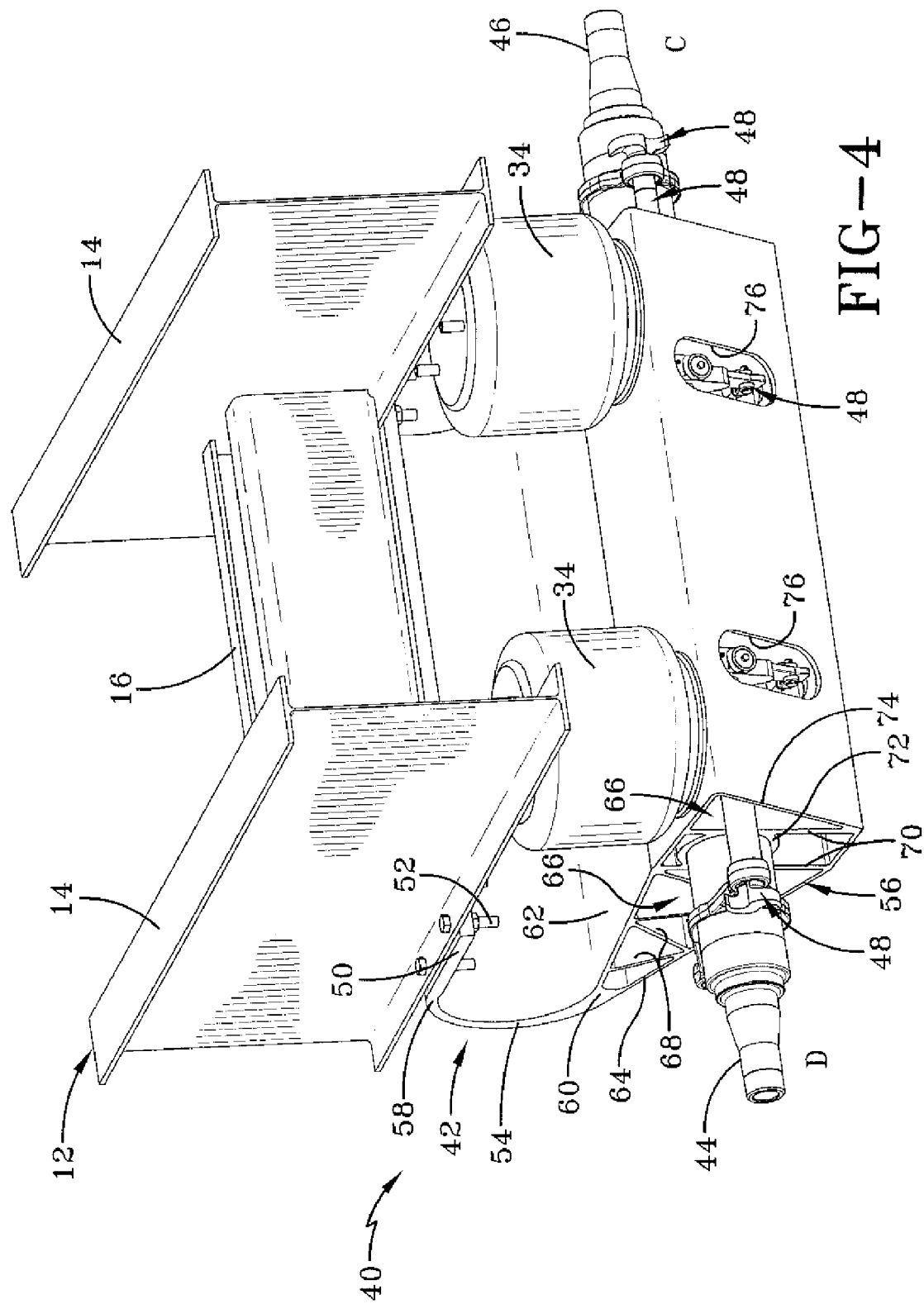
FIG. 4 is a rear perspective view of the structure shown in FIGS. 2 and 3.

Turning now to FIG. 4, driver side axle spindle 44 is received in driver side D of cylindrical truss member 72, while curb side axle spindle 46 is received in curb side C of the cylindrical truss member. Cylindrical truss member 72 extends completely across axle/suspension integral arm structure 42, and each respective axle spindle 44, 46 extends into the cylindrical truss member for a distance adequate to provide support for the spindles and to allow each respective spindle to be bonded or attached to the cylindrical truss member. Preferably, each spindle 44, 46 may extend about 8-12 inches into cylindrical truss member 72 and be bonded to an inner wall of the cylindrical truss member with a high-strength adhesive that is known in the art. A through-bolt (not shown) or similar mechanical fastener preferably is used in combination with the adhesive to provide mechanical attachment of each spindle 44, 46 to cylindrical truss member 72.

Alternatively, the through-bolt or another known mechanical fastener may be used to secure the attachment of each spindle 44, 46 to cylindrical truss member 72 without an adhesive. Optionally, driver side spindle 44 and curb side spindle 46 may be connected to one another across cylindrical truss member 72 by means such as a through-bolt or thin-walled tube that extends between the spindles, such as a tube with a five-inch diameter, one-quarter (¼) inch wall thickness round tube. Such means operate to secure spindles 44, 46 in place, while cylindrical truss member 72 and the remainder of axle/suspension system integral arm structure 42 carry the operational load Forces. As another alternative, an axle tube 28 of the prior art (FIG. 1) may extend through cylindrical truss member 72 so that the cylindrical truss member secures and supports the axle tube.

Figure 5:
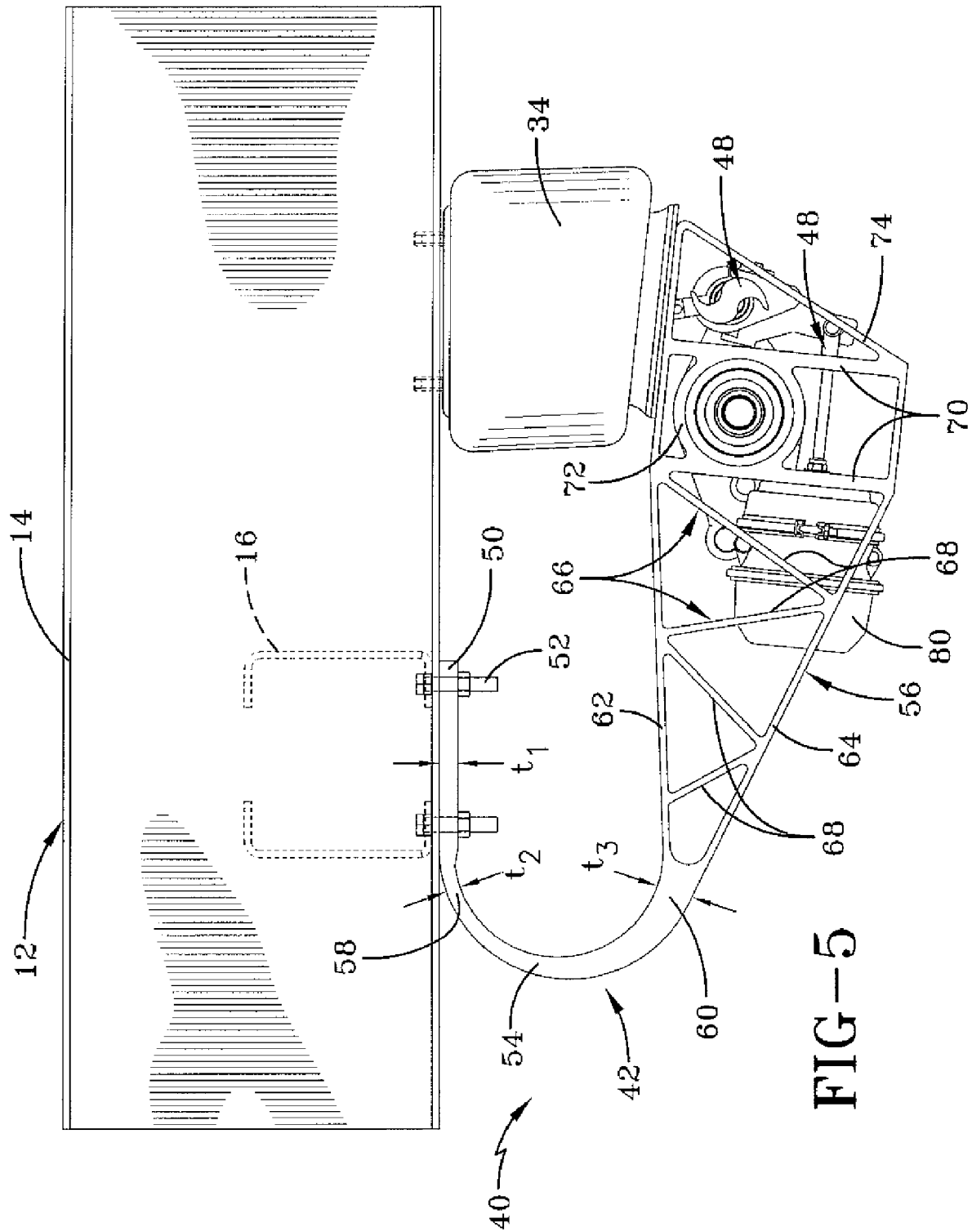
FIG. 5 is a side elevational view of the structure shown in FIGS. 2 through 4, with a hidden cross member of the vehicle frame represented by dashed lines.

With additional reference now to FIG. 5, rear truss member 74 is formed integrally with and located rearwardly of rectangular truss member 70. Preferably, rear truss member 74 is formed with openings 76 to allow components of brake system 48 to be mounted on axle/suspension integral arm structure 42 and accessed for repair and replacement. Axle/suspension integral arm structure 42 preferably is formed from a composite material through a pultrusion or extrusion process, as described in greater detail below. It is to be understood that, while reference herein is made to various openings that are formed in axle/suspension integral arm structure 42, such forming preferably occurs by machining the integral arm structure after it is formed by pultrusion or extrusion. Bottom truss plate 64 also preferably is formed with openings 78 to allow mounting of and access to brake air chambers 80. Additional openings 82 may be formed in certain truss members 66 to facilitate such mounting of and access to brake components 48, as well as to other suspension components.

Furthermore, top truss plate 62 of integral arm structure 42 provides a table-like surface or platform having sufficient area to mount components such as shock absorbers (not shown) and air springs 34, which extend upwardly from the top truss plate and are mounted at their upper end to vehicle frame main members 12. Accordingly, openings 84, shoulders and mounting projections (not shown) to attach these and other components to axle/suspension system integral arm structure 42 may be formed on upper plate 50, transition member 54 or truss structure 56 of the integral arm structure.

It is to be understood that axle/suspension integral arm structure 42 is an integral unit, the individual components of which cooperate in the distribution of forces during vehicle operation. Process limitations may prevent initial formation of different portions of integral arm structure 42 as a single piece, but the separate pieces are bonded or otherwise joined to form an integral one-piece unit, to be described in detail below. In addition, axle/suspension integral arm structure 42, including truss structure 56 thereof, can be adjusted in size, shape, and thickness to distribute forces in a desired manner according to a particular application. The configuration of truss members 66 can also be adjusted to suit a particular application, such as to a honeycomb-style arrangement.

Thus, first embodiment of integral axle/suspension system 40 replaces central tube 30 of axle 28, trailing arm beams 22, bushing assembly 24, and hangers 18 of prior art axle/suspension system 10 with an integral, one-piece integral arm structure 42, which eliminates attachment joints for the various separate components and provides for better force distribution during vehicle operation. More particularly, curved transition member 54 of integral arm structure 42 reacts vertical, fore-aft, side-load and roll forces by acting as a hinge and by spreading the forces out over a large area, rather than isolating them in bushings 24 as in the prior art, as will be described in greater detail below. Truss structure 56, having a rigid structure, cooperates with transition member 54 and provides stability for axle/suspension system 40.

Turning now to FIGS. 6-9, a second exemplary embodiment of the integral axle/suspension system of the present invention is indicated generally at 90 Second embodiment axle/suspension system 90 includes a pair of integral arm structures 92 which capture a traditional axle 28 and replace other components of prior art axle/suspension system 10 (shown in FIG. 1), including frame hangers 18, trailing arm beams 22 and bushing assemblies 24. Second embodiment axle/suspension system 90 includes traditional axle central tube 30, axle spindle ends 32, ail springs 34 and shock absorbers 36, while, as mentioned, integral arm structures 92 serve as an alternative to traditional beams 22, hangers 18 and bushings 24. Components of brake system 48, while not part of axle/suspension system 90, are preferably mounted to integral arm structures 92 and are shown for the sake of completeness.

Figure 6:
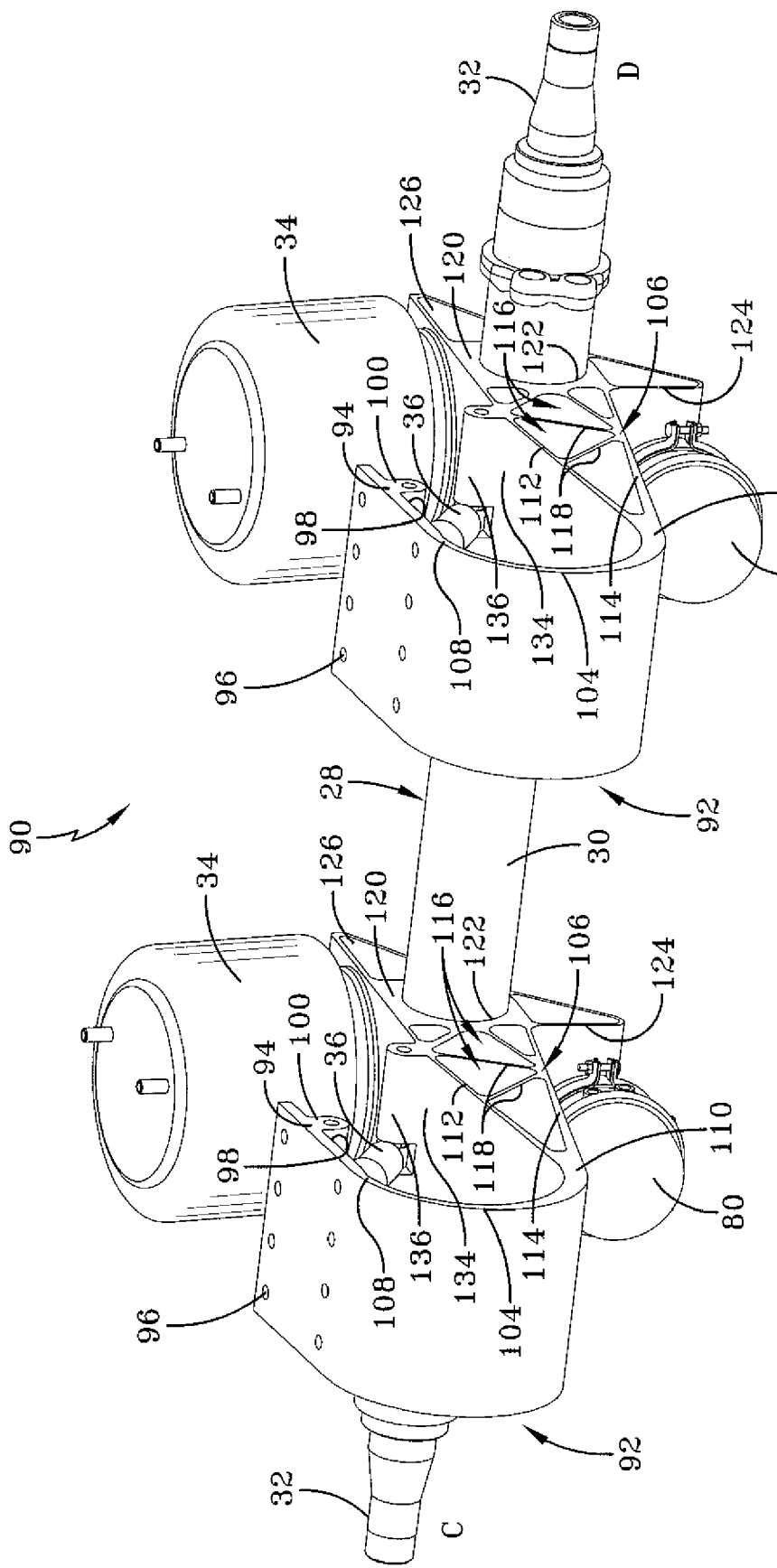
FIG. 6 is a front perspective view of a second exemplary embodiment of the integral axle/suspension system of the present invention, shown with a brake system mounted thereon.
Figure 7:
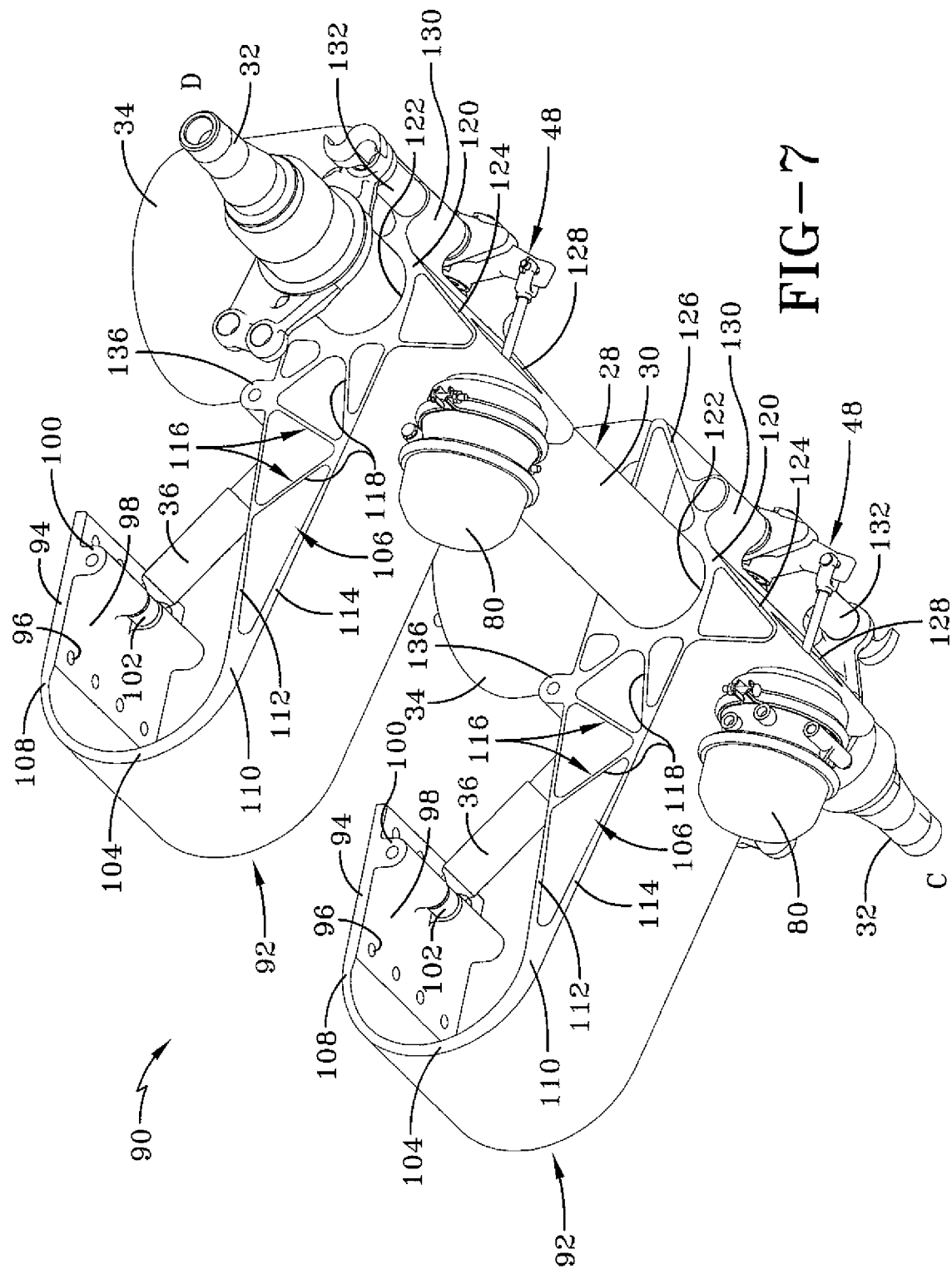
FIG. 7 is a bottom perspective view of the structure shown in FIG. 6.

With specific reference to FIGS. 6 and 7, axle/suspension system integral arm structures 92 are mounted on a vehicle frame (such as vehicle frame 12 shown in FIG. 1) in a transversely spaced, parallel manner. Each axle/suspension system integral arm structure 92 includes a generally continuous, transversely-extending cross section which allows for the distribution of forces, as well as ease of manufacturing. Reference herein will now be made to a single axle/suspension system integral arm structure 92 for simplicity, with the understanding that the description applies to both integral arm structures. An upper plate 94 of integral arm structure 92 is formed with holes 96 to allow the axle/suspension system integral arm structure to be fastened to the vehicle frame, and in particular to the main members and certain ones of the cross members of the vehicle frame via usual fastening means, such as bolts. Preferably, axle/suspension system 90 includes an alignment assembly, to be described below.

Upper plate 94 has a thickness $t_4$ (FIG. 9), which provides strength while allowing the plate to be bolted directly to the vehicle frame Preferably formed on and depending from a bottom surface 98 of upper plate 94 is a first shoulder 100 to allow an upper end 102 of a shock absorber 36 to be mounted on integral arm structure 92 in order to dampen loading effects From upper plate 94, a curved transition member 104 of axle/suspension system integral arm structure 92 curves frontwardly downward and then rearwardly downward to a body 106, which is a truss structure. Curved transition member 104 is shown in second embodiment axle/suspension system 90 as C-shaped and includes a cross-sectional geometry that allows the transition to flex while remaining structurally stable, enabling integral arm structure 92 to articulate in a pivotal-like motion during vehicle operation. Preferably, curved transition member 104 includes a portion 108 having a thickness $t_5$ that is less than thickness $t_4$ of upper plate 94 to encourage articulation of integral arm structure 92. This simplified structure of present invention axle/suspension system 90 is in contrast to prior art system 10, which utilizes bushing assemblies 24, frame hangers 18 and beams 22 to achieve such pivotal movement. At a point 110, as curved transition member 104 approaches truss structure 106, the thickness of the transition member preferably increases to a maximum dimension $t_6$, which is greater than that of $t_4$ to provide increased structural support.

Truss structure 106 includes a generally horizontal, rearwardly-extending top truss plate 112 and a downwardly-angled, rearwardly-extending bottom truss plate 114 Extending between and forming an integral unit with top truss plate 112 and bottom truss plate 114 are individual truss members 116 Truss members 116 are adjusted in form and orientation to suit the particular requirements of axle/suspension system 90, such as anticipated load conditions for a certain type of vehicle. For example, individual truss members 116 preferably include angular truss members 118, an axle-mounting truss member 120, a lower truss member 124 and a rear support truss member 126. Angular truss members 118 extend between top truss plate 112 and bottom truss plate 114 at various angles relative to the top and bottom truss plates beginning near curved transition member 104, continuing rearwardly to axle-mounting truss member 120, which is formed with an opening 122 for capturing axle 28.

Figure 8:
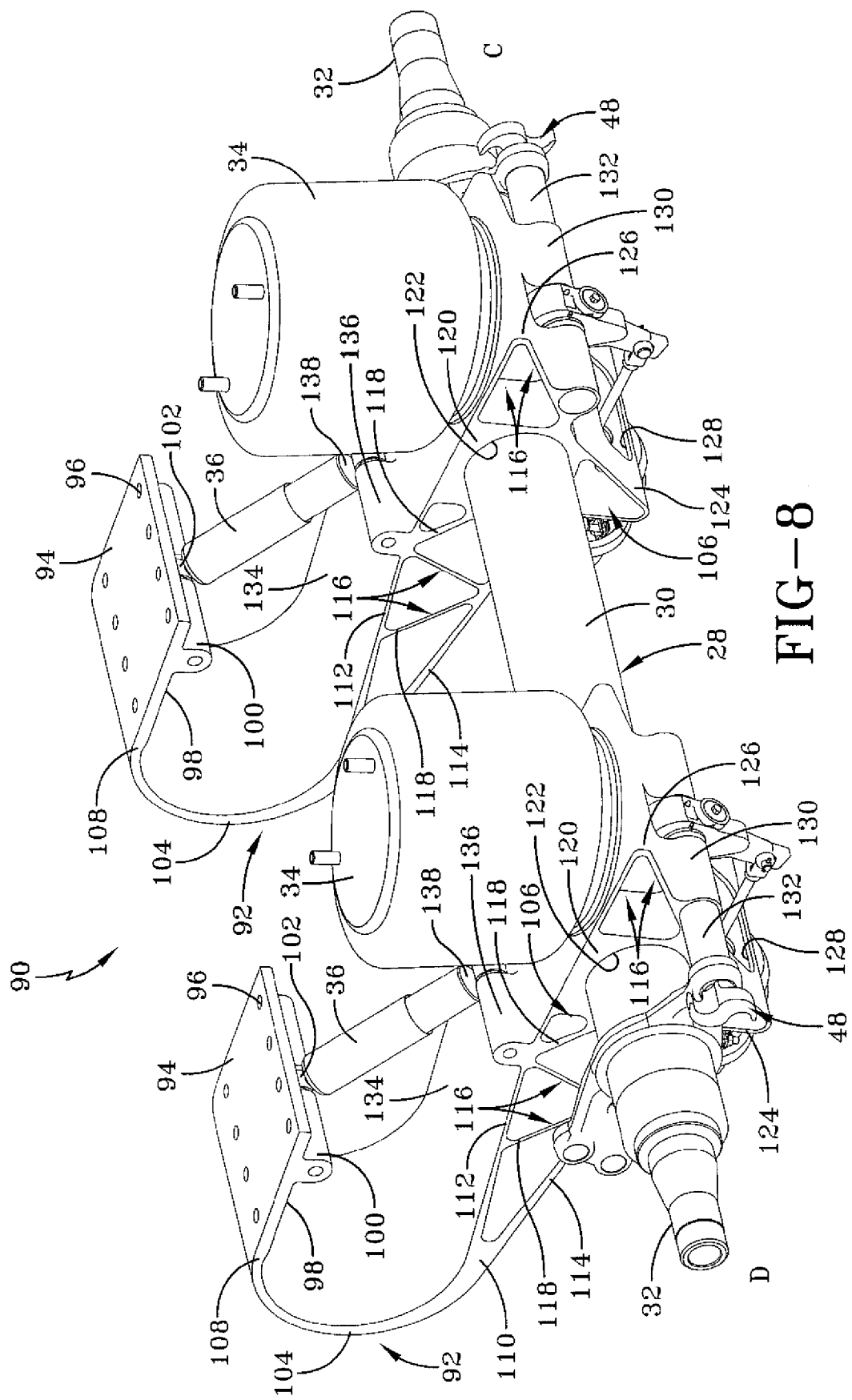
FIG. 8 is a rear perspective view of the structure shown in FIGS. 6 and 7.
Figure 9:
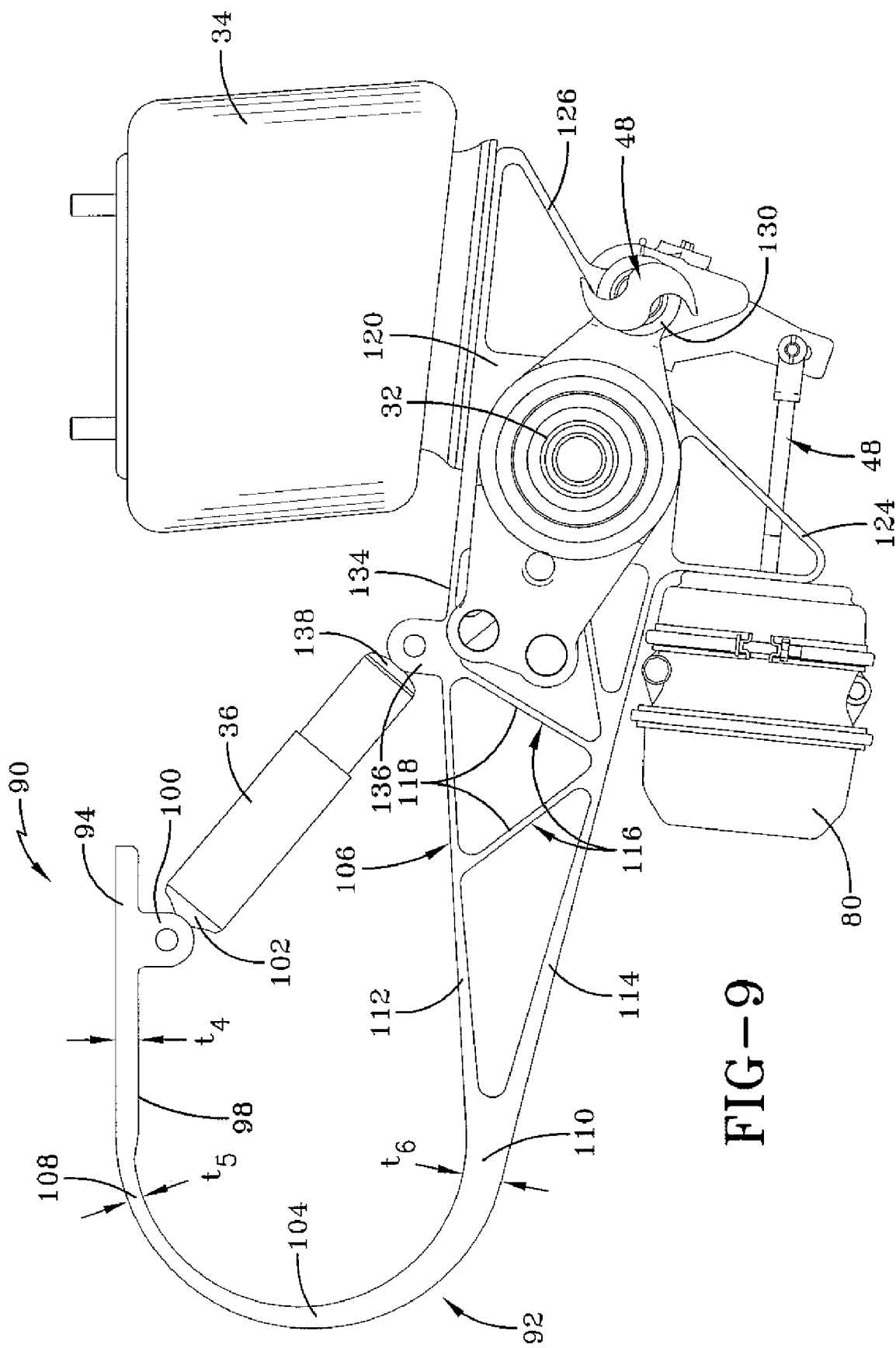
FIG. 9 is a side elevational view of the structure shown in FIGS. 6 through 8.

With additional reference to FIGS. 8 and 9, axle 28 is attached to axle-mounting truss member 120 by bonding the axle to the mounting truss member, such as with an adhesive, and optionally using a bolt either alone or in combination with an adhesive. Each spindle end 32 extends outboard from its respective proximate integral arm structure 92, and central axle tube 30 is disposed generally inboard from and between the integral arm structures. It is important to note that, while axle 28 of the prior art, including central tube 30 and spindle ends 32, is described in conjunction with second embodiment axle/suspension system 90, the second embodiment of the invention may use other types of axles, such as an axle having a square cross-section, without affecting the overall inventive concepts.

To provide additional support and distribution of forces, lower support truss member 124 preferably is formed below axle-mounting truss member 120. Similarly, rear support truss member 126 preferably is formed with and extends rearwardly from axle-mounting truss member 120. Lower support truss member 124 preferably is formed with openings 128 to allow components such as brake air chambers 80 to be mounted on integral arm structure 92. Other features, such as a rear mounting feature 130 on rear support truss 126, may be integrally formed on integral arm structure 92 to allow the mounting of brake system components such as cam shaft 132.

Corresponding to first shoulder 100 formed on upper plate 94, which is described above, a second shoulder 136 preferably is formed on an upper surface 134 of top truss plate 112 for mounting a lower end 138 of shock absorber 36 on integral arm structure 92 to dampen loading effects. A lower end of air spring 34 is preferably mounted on upper surface 134 of top truss plate 112 rearwardly of second shoulder 136 and above rear support truss 126. Air spring 34 extends upwardly therefrom and is mounted at its upper end on the vehicle frame (not shown).

In this manner, second embodiment axle/suspension system 90 replaces several of the conventional components of the prior art axle suspension system 10 shown in FIG. 1, including frame hangers 18, beams 22 and bushing assemblies 24. Second embodiment axle/suspension system 90 finds specific application in areas where a reduction in cost through the use of two narrower integral arm structures 92 is desirable, as compared to the potentially higher cost of a single, wider integral arm structure 42 from first embodiment axle/suspension system 40. In addition, second embodiment axle/suspension system 90 finds specific application in areas where design considerations dictate the use of a traditional axle 28 of the prior art having a typical central tube 30.

Turning now to FIGS. 10-13, a third exemplary embodiment of the integral axle/suspension system of the present invention is indicated generally at 140. Third embodiment axle/suspension system 140 includes an integral arm structure 142 and an axle 144, which includes an axle tube 146, driver side axle spindle 148 and curb side axle spindle 150. Preferably, axle/suspension system 140 also includes air springs and shock absorbers (not shown). Integral arm structure 142 is an integral, one-piece structure that eliminates many separate components found in prior art axle/suspension system 10, including beams 22, bushing assemblies 24, and hangers 18. Components of the vehicle brake system 48, such as brake air chamber 80, while not part of third embodiment axle/suspension system 140, are preferably mounted to integral arm structure 142 and are shown for the sake of completeness.

Figure 10:
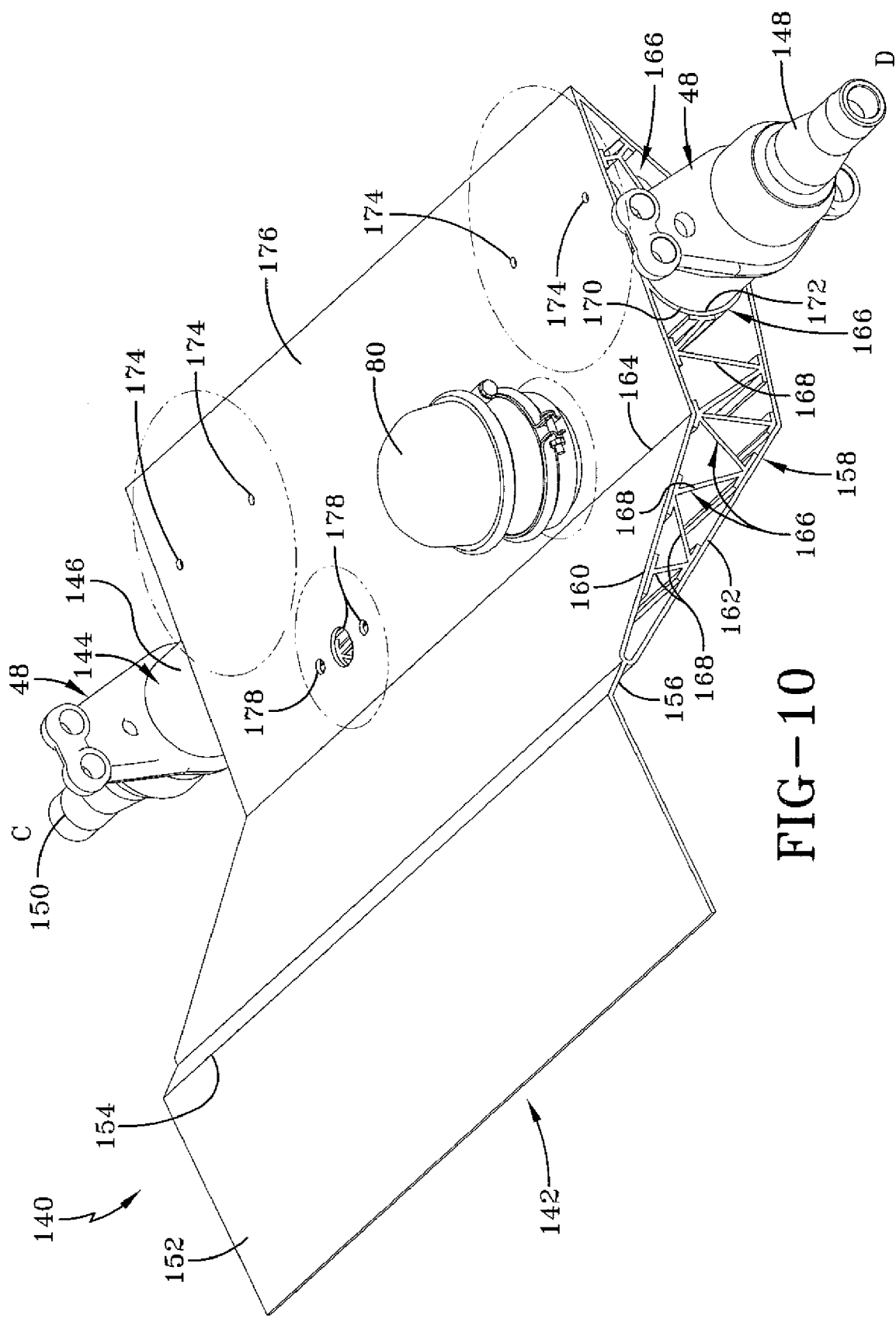
FIG. 10 is a top side perspective view of a third exemplary embodiment of the integral axle/suspension system of the present invention, with air springs and shock absorbers removed and certain components of a brake system installed.
Figure 11:
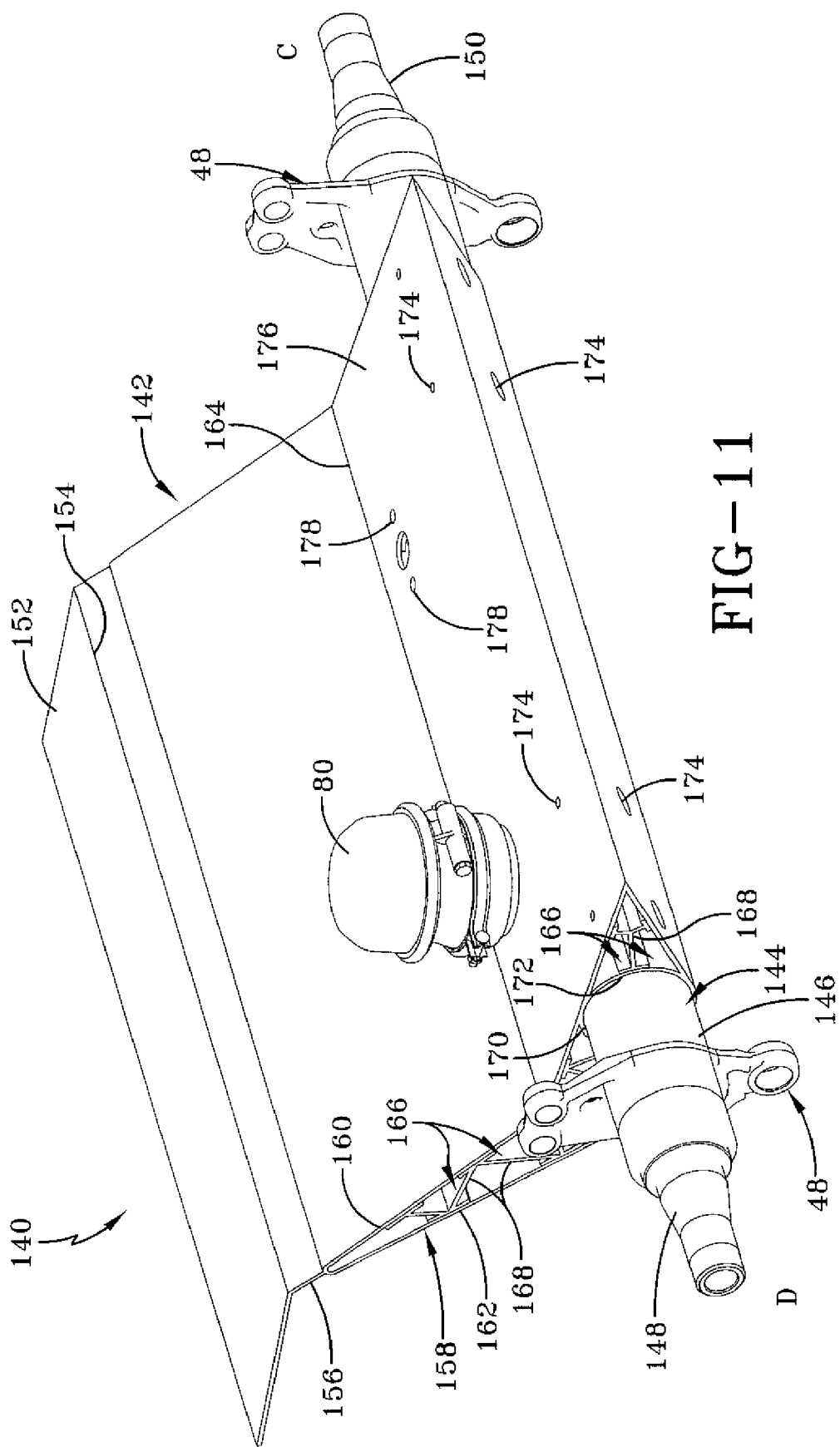
FIG. 11 is a rear perspective view of the structure shown in FIG. 10.
Figure 12:
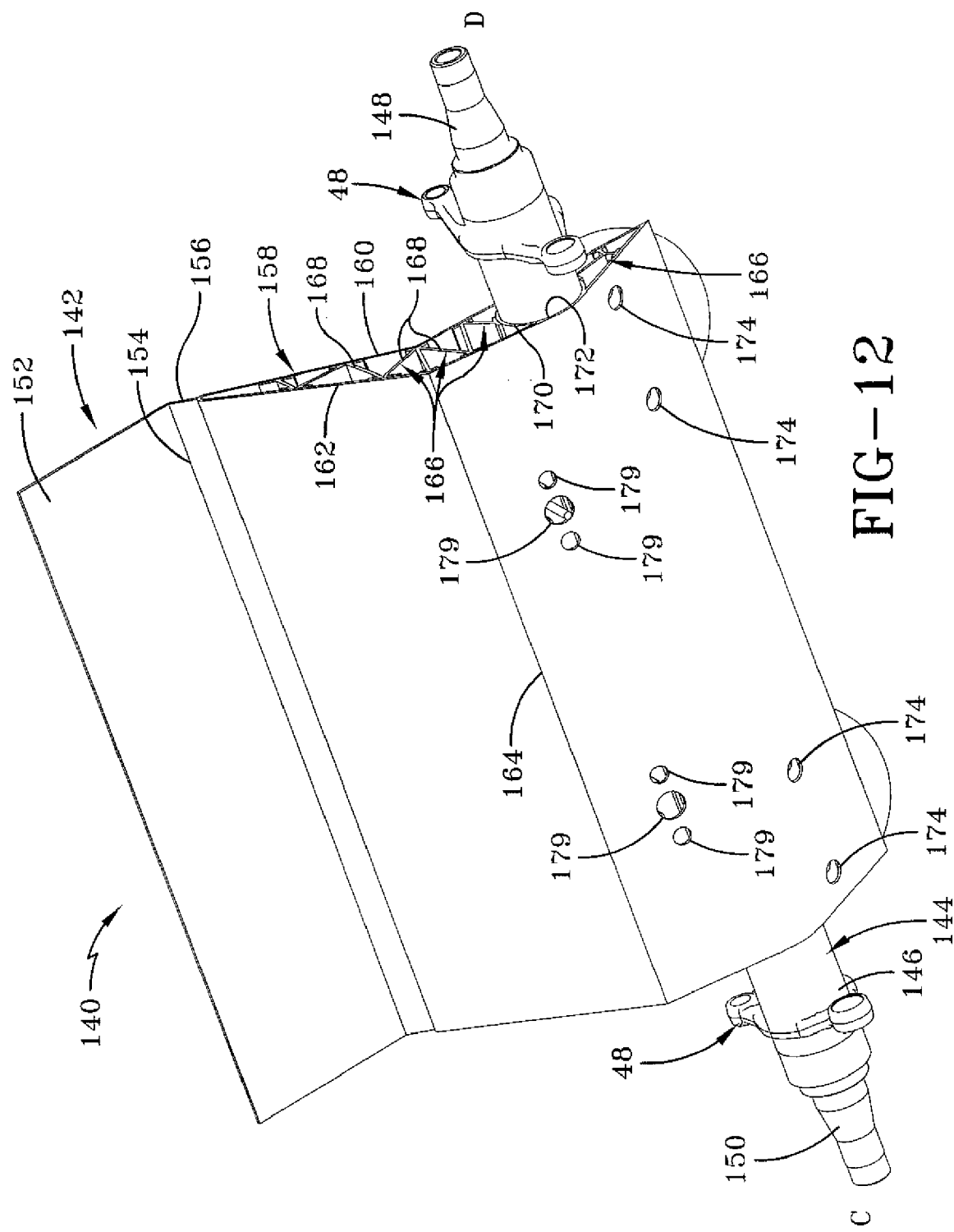
FIG. 12 is a bottom perspective view of the structure shown in FIGS. 10 and 11.
Figure 13:
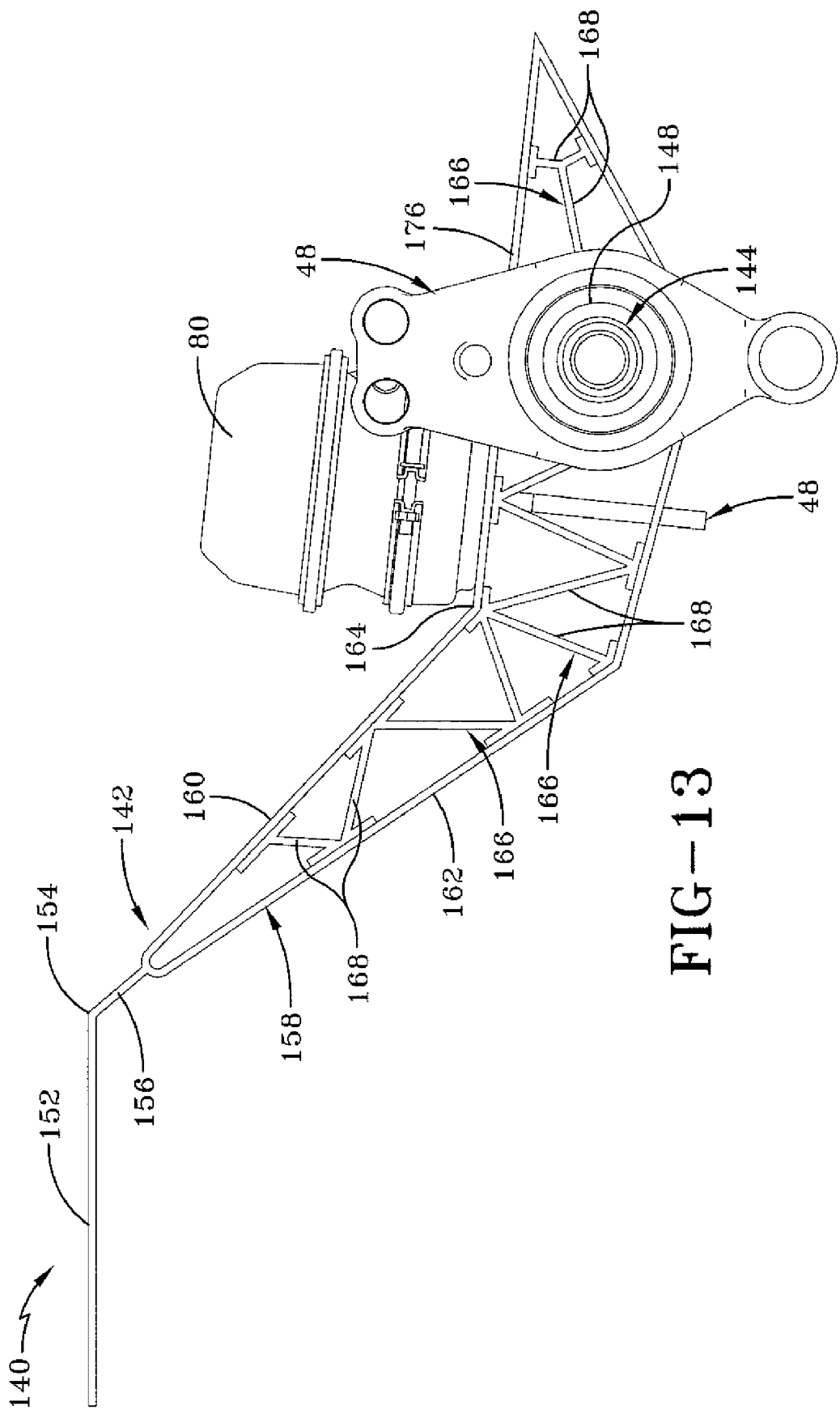
FIG. 13 is a side elevational view of the structure shown in FIGS. 10 through 12.

With particular reference to FIGS. 10 and 11, integral arm structure 142 extends substantially across the width of trailer frame 12 (FIG. 2) on which axle/suspension system 140 is installed. Axle/suspension system integral arm structure 142 includes a generally continuous, transversely-extending cross section which provides for the aforementioned distribution of forces as well as ease of manufacturing Integral arm structure 142 includes an upper plate 152, which preferably acts as an attachment member to connect the axle/suspension system integral arm structure directly to the vehicle frame with bolts or other fastening means known in the art. Alternatively, other structural members (not shown) may be interposed between upper plate 152 and vehicle frame 12, such as spacers, shims, mounting members and the like.

From a rearward edge 154 of upper plate 152, an angular transition member 156 extends rearwardly downward, preferably at an angle of from about 30 to about 70 degrees relative to horizontal, for a short distance to a rearwardly-extending body 158, which is a truss structure. With additional reference to FIGS. 12 and 13, truss structure 158 initially extends rearwardly downward at approximately the same angle as angular transition member 156, that is, preferably from about 30 to about 70 degrees relative to horizontal. Truss structure 158 includes a generally downwardly-angled, rearwardly-extending top truss plate 160 and a downwardly-angled, rearwardly-extending bottom truss plate 162. Preferably, the downward angle of bottom truss plate 162 is steeper than that of top truss plate 160, so that as truss structure 158 progresses rearwardly downward, the distance between top truss plate 160 and bottom truss plate 162 increases.

At a transition point 164, the rearwardly-downward extension of truss structure 158 changes from its relatively steep angle of from about 30 to about 70 degrees to a less steep angle of from about 0 to about 20 degrees relative to horizontal Extending between and integrally formed with top truss plate 160 and bottom truss plate 162 are individual truss members 166. Truss members 166 are adjusted in form and orientation to suit the particular requirements of axle/suspension system 140 for a particular vehicle. For example, individual truss members 166 preferably include angular truss members 168 and a cylindrical truss member 170. Angular truss members 168 extend between top truss plate 160 and bottom truss plate 162 at various angles relative to the top and bottom truss plates beginning near angular transition member 156, continuing rearwardly past transition point 164 to cylindrical truss member 170.

Cylindrical truss member 170 extends completely across axle/suspension integral arm structure 142 and forms an opening 172 through which axle tube 146 passes By. capturing axle tube 146, cylindrical truss member 170, and thus integral arm structure 142, locates the position of axle 144 and provides structural support for the axle. Each axle spindle 148, 150 extends outboardly from a corresponding end of central axle tube 146. More particularly, driver side axle spindle 148 extends from the driver end D of axle tube 146 and is thus adjacent the driver side D of cylindrical truss member 170, while curb side axle spindle 150 extends from the curb end C of the axle tube and is thus adjacent the curb side C of the cylindrical truss member.

Optionally, spindles 148, 150 may be directly attached to integral arm structure 142 without axle tube 146, thereby using cylindrical truss member 170 in place of the axle tube. In such an application, driver side axle spindle 148 is received in opening 172 at the driver side D of cylindrical truss member 170, while curb side axle spindle 150 is received in the opening at the curb side C of the cylindrical truss member. Each spindle 148, 150 extends into cylindrical truss member 170 a distance adequate to provide support for the spindle and to allow each spindle to be bonded to the cylindrical truss member. For example, each spindle 148, 150 may extend about 8-12 inches into cylindrical truss member 170 and be bonded to an inner wall of the cylindrical truss member with a high-strength adhesive that is known in the art. A through-bolt (not shown) optionally may be used alone or in combination with the adhesive to provide mechanical attachment of each spindle 148, 150 to cylindrical truss member 170. If axle tube 146 is eliminated, appropriate adjustments to the geometry and dimensions of integral arm structure 142, including cylindrical truss member 170 in particular, preferably are made to provide appropriate stability to replace the axle tube and thus allow the cylindrical truss member and the remainder of the integral arm structure to carry the operational load forces.

Rearwardly of cylindrical truss member 170, bottom truss plate 162 curves upwardly to meet top truss plate 160 and additional angular truss members 166 extend between the top and bottom truss plates. Rearwardly of transition point 164, top truss plate 160 provides a table-like surface 176 with sufficient area to mount components such as shock absorbers and air springs (not shown), which extend upwardly from the top truss plate and are mounted at their upper end to vehicle frame main members 13 (FIG. 2) Openings 174 are preferably formed in top and bottom truss plates 160, 162 to facilitate the mounting of and access to the air springs It is to be understood that, while reference herein is made to various openings that are formed in composite structure 142, such forming occurs by machining the composite structure after its initial pultrusion or extrusion process, which will be described in greater detail below. Additional openings 178 are preferably formed in table-like surface 176 of top truss plate 160 to allow mounting of and access to brake air chambers 80. Further openings 179 may be formed in members of integral arm structure 142 to facilitate further mounting of and access to brake system 48 and other components.

In this manner, a structure is provided by axle/suspension integral arm structure 142 that allows for increased distribution of load forces. That is, the combination of angular transition member 156 and the angled portion of truss structure 158 above transition point 164 allows the angular transition member to flex while remaining structurally stable, enabling integral arm structure 142 to articulate in a pivotal-like motion during vehicle operation and react vertical, fore-aft, side-load and roll forces, as will be described in greater detail below. This simplified structure of third embodiment present invention axle/suspension system 140 is in contrast to prior art system 10, which utilizes beams 22, bushing assemblies 24 and frame hangers 18 to achieve such pivotal movement. Moreover, truss structure 158, being rigid, cooperates with angular transition member 156 and provides stability for axle suspension system 140.

Axle/suspension integral arm structure 142 has been described as an integral, one-piece unit. Of course, process limitations may prevent initial formation of different portions of axle/suspension integral arm structure 142 as a single piece, but the separate pieces are bonded of otherwise joined to form an integral one-piece unit, to be described in detail below. In addition, axle/suspension integral arm structure 142, including truss structure 158 thereof, can be adjusted in size, shape, arrangement, and thickness to distribute forces in a desired manner according to a particular application. The thickness and orientation of truss members 166 also can be varied to suit a particular application.

Thus, third embodiment of integral axle/suspension system 140 replaces trailing arms 22, bushing assembly 24, and frame hangers 18 of prior art axle/suspension system 10 with an integral, one-piece structure 142, which eliminates attachment joints for the various separate components and provides for better force distribution during vehicle operation.

Turning now to FIGS. 14-17, a fourth exemplary embodiment of the integral axle/suspension system of the present invention is shown attached to vehicle frame 12 and indicated generally at 180. Fourth embodiment axle/suspension system 180 includes a pair of integral arm structures 182 which capture a conventional axle 28 and replace other components of prior art axle/suspension system 10 (shown in FIG. 1), including trailing arm beams 22, bushing assemblies 24 and frame hangers 18. Fourth embodiment system 180 includes traditional axle central tube 30, axle spindle ends 32, air springs 34 and shock absorbers 36, while integral arm structures 182 serve as an alternative to traditional beams 22, hangers 18 and bushings 24. Components of brake system 48, while not part of axle/suspension system 180, are preferably mounted to integral arm structures 182 and are shown for the sake of completeness.

Figure 14:
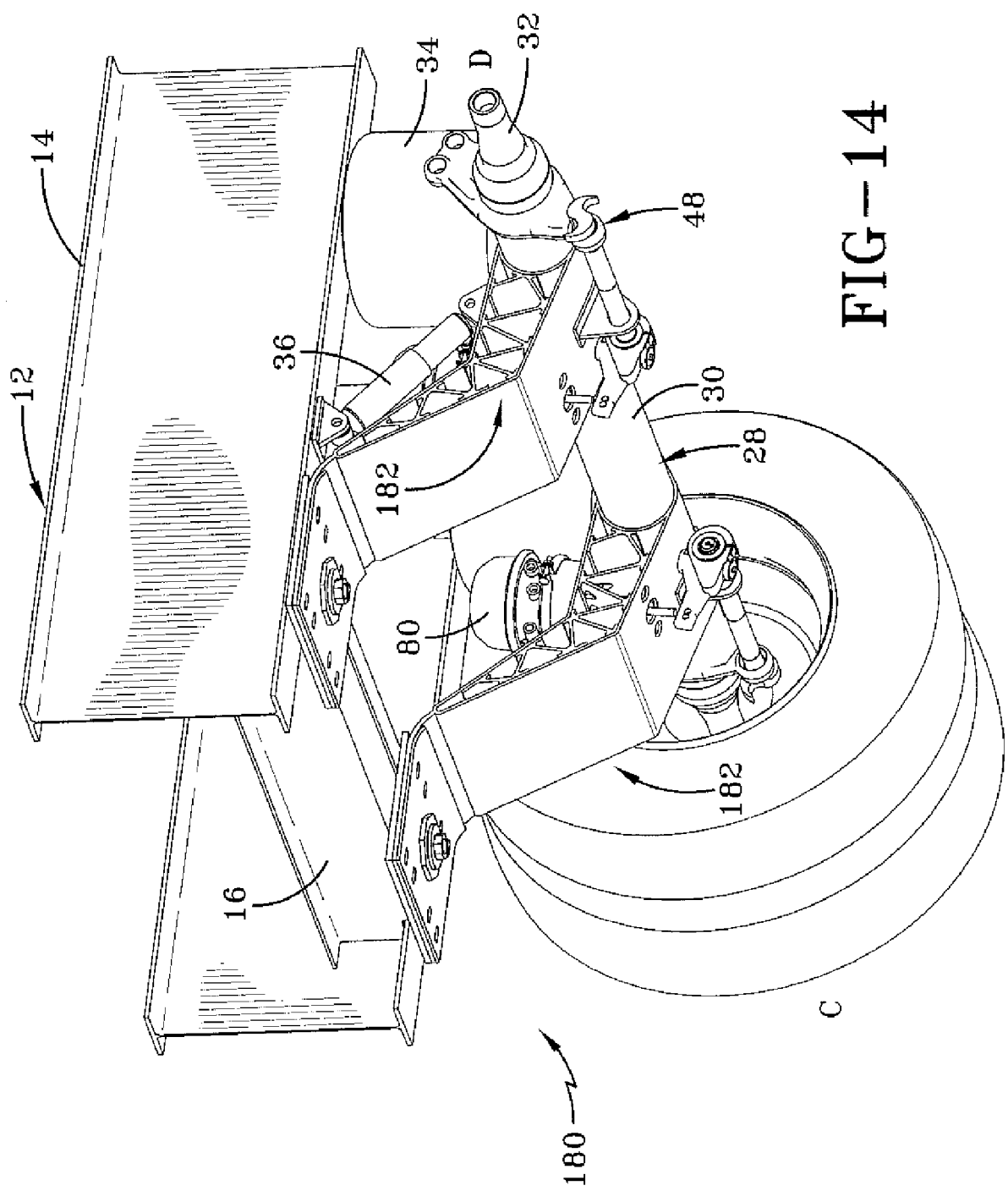
FIG. 14 is a bottom front perspective view of a fourth exemplary embodiment of the present invention shown connected to a heavy-duty vehicle frame, and further showing certain wheels of the vehicle and a brake system attached to the axle/suspension system.
Figure 15:
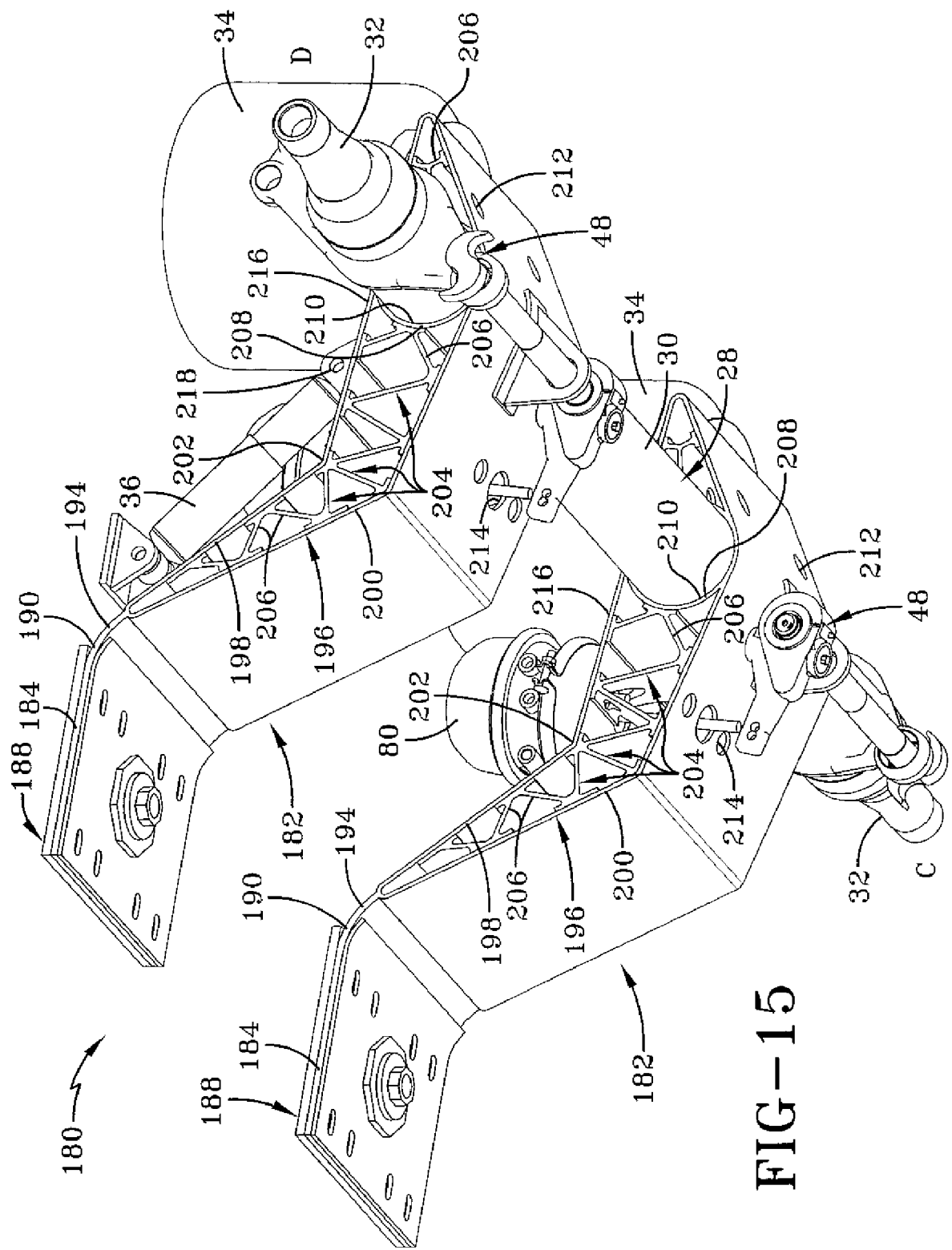
FIG. 15 is a bottom perspective view of the structure shown in FIG. 14, without the vehicle frame and wheels.

With specific reference to FIGS. 14 and 15, integral arm structures 182 are mounted on main members 14 and selected cross members 16 of vehicle frame 12 in a transversely-spaced, rearwardly-extending or trailing, parallel manner.

Each integral arm structure 182 includes a generally continuous, transversely-extending cross section which allows for the distribution of forces, as well as ease of manufacturing. Reference herein now will be made to a single integral arm structure 182 for simplicity, with the understanding that the description applies to both identical structures An upper plate 184 is formed with holes 186 to allow axle/suspension system integral arm structure 182 to be fastened to vehicle frame 12 via usual fastening means, such as bolts. Preferably, an alignment assembly 188, to be described in detail below, is used to provide proper alignment of integral arm structure 182.

Figure 16:
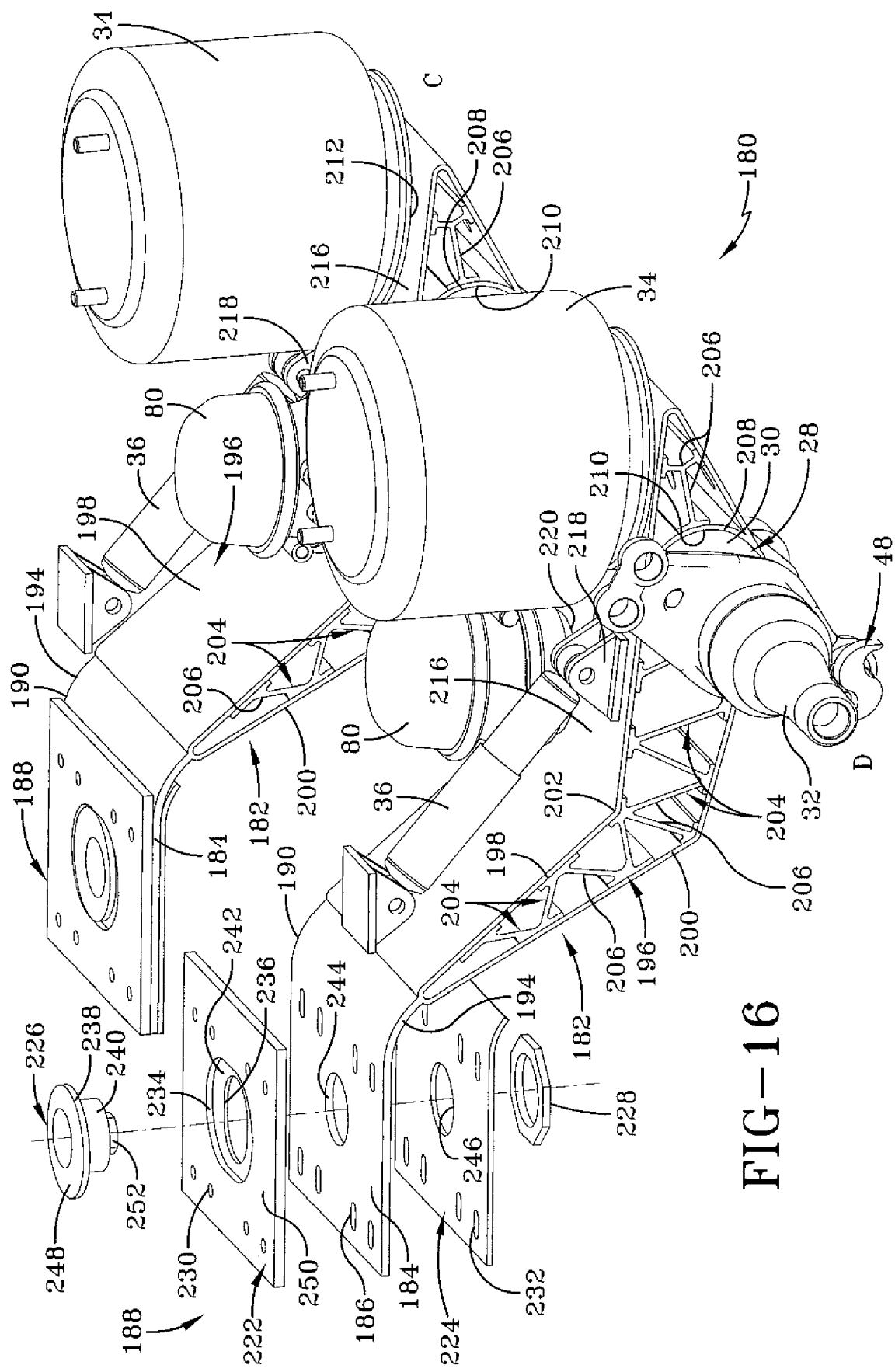
FIG. 16 is a side perspective view of the structure shown in FIG. 15, with a pair of first exemplary embodiment alignment assemblies, one of which is shown in exploded form and the other of which is shown in assembled form.
Figure 17:
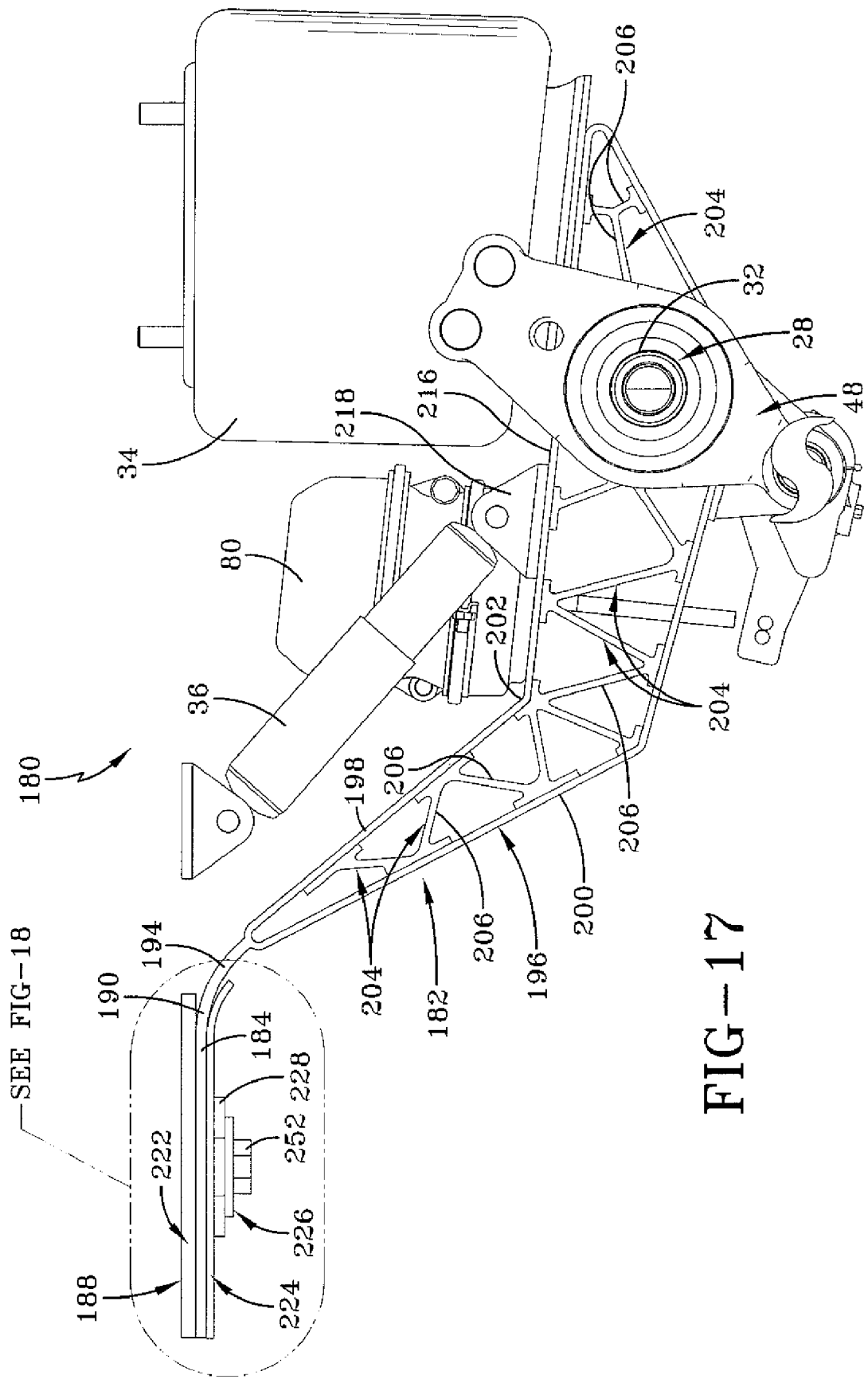
FIG. 17 is a side elevational view of the structure shown in FIGS. 15 and 16, with both first embodiment alignment assemblies shown in assembled form.

With additional reference to FIGS. 16 and 17, from a rearward edge 190 of upper plate 184, an angular transition member 194 curves rearwardly downward, preferably at an angle of from about 30 to about 70 degrees relative to horizontal, for a short distance to a rearwardly-extending body 196, which is a truss structure. Truss structure 196 initially extends rearwardly downward at approximately the same angle as angular transition member 194, that is, preferably from about 30 to about 70 degrees relative to horizontal. Truss structure 196 includes a generally downwardly-angled, rearwardly-extending top truss plate 198 and a downwardly-angled, rearwardly-extending bottom truss plate 200 Preferably, the downward angle of bottom truss plate 200 is steeper than that of top truss plate 198, so that as truss structure 196 progresses rearwardly downward, the distance between top truss plate 198 and bottom truss plate 200 increases.

At a transition point 202, the rearwardly-downward extension of truss structure 196 changes from its relatively steep angle of from about 30 to about 70 degrees to a less steep angle of from about 0 to 20 degrees relative to horizontal. Extending between and integrally formed with top truss plate 198 and bottom truss plate 200 are individual truss members 204. Truss members 204 are adjusted in form and orientation to suit the particular requirements of axle/suspension system 180 for a particular vehicle. For example, individual truss members 204 preferably include angular truss members 206 and a cylindrical truss member 208. Angular truss members 206 extend between top truss plate 198 and bottom truss plate 200 at various angles relative to the top and bottom truss plates beginning near angular transition member 194, continuing rearwardly past transition point 202 to cylindrical truss member 208.

Cylindrical truss member 208 is formed with an opening 210 for capturing axle 28. Axle 28 passes through opening 210 and is attached to cylindrical truss member 208 by bonding the axle to the cylindrical structure, such as with an adhesive, and optionally using a bolt either alone or in combination with an adhesive. Axle 28 is thus substantially surrounded by cylindrical truss member 208 and integral arm structure 182. Each spindle end 32 extends outboard from its respective proximate integral arm structure 182, and central axle tube 30 is disposed generally inboard from and between the integral arm structures. It is important to note that, while axle 28, including central tube 30 and spindle ends 32, of the prior art is described in conjunction with fourth embodiment axle/suspension system 180, the fourth embodiment of the invention may use other types of axles, such as an axle having a square cross-section, without affecting the overall inventive concepts.

Rearwardly of cylindrical truss member 208, bottom truss plate 200 curves upwardly to meet top truss plate 198 and additional angular truss members 206 extend between the top and bottom truss plates. Rearwardly of transition point 202, top truss plate 198 provides a table-like surface 216 with sufficient area to mount components such as air springs 34 and shock absorbers 36, which extend upwardly from the top plate and are mounted at their upper ends to vehicle frame main members 12. Openings 212 are preferably formed in top and bottom truss plates 198, 200 to facilitate the mounting of air springs 34. It is to be understood that, while reference herein is made to various openings that are formed in integral arm structure 182, such forming occurs by machining the integral arm structure after its initial pultrusion or extrusion process, to be described below. Other features, such as a mounting shoulder 218 to respectively connect a lower end of each shock absorber 36 to integral arm structure 182, may optionally be mounted to or formed on surface 216. Additional openings 220 are preferably formed in table-like surface 216 of top truss plate 198 to allow mounting of and access to brake air chambers 80. Further openings 214 may be formed in members of integral arm structure 182 to facilitate further mounting of and access to brake system 48 and other components.

The combination of the angled portion of truss structure 196 above transition point 202 and angular transition member 194 allows the angular transition member to flex while remaining structurally stable, enabling integral arm structure 182 to articulate in a pivotal motion during vehicle operation. In this manner, fourth embodiment composite axle/suspension system 180 replaces certain components of prior art axle suspension system 10 shown in FIG. 1, including frame hangers 18, bushing assemblies 24, and beams 22. Fourth embodiment axle/suspension system 180 finds specific application in areas where a reduction in cost through the use of two narrower integral arm structures 182 is desirable, as compared to the potentially higher cost of a single, wider integral arm structure 142 from third embodiment axle/suspension system 140. In addition, fourth embodiment axle/suspension system 180 finds specific application in areas where design considerations dictate the use of a traditional axle 28 of the prior art having a typical central tube 30.

Figure 18:
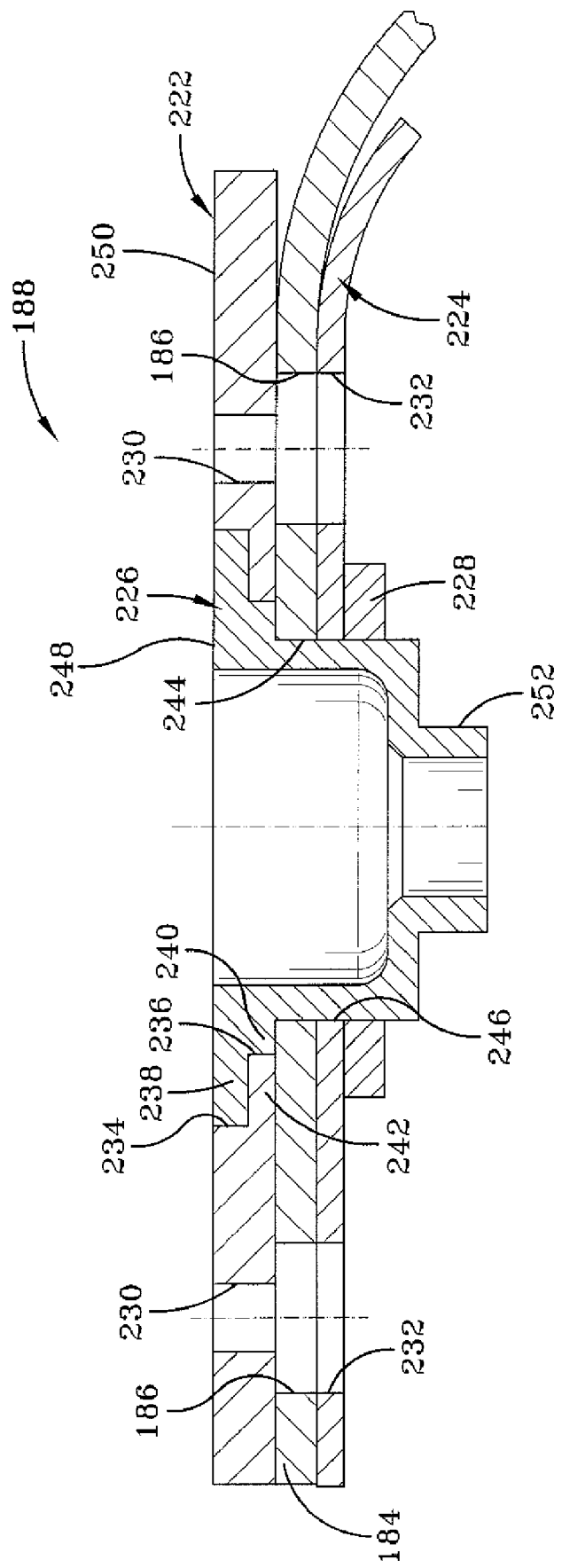
FIG. 18 is an enlarged sectional view of an alignment assembly shown in FIG. 17, taken along a longitudinal centerline of the assembly.

With reference now to FIGS. 16-18, first exemplary embodiment alignment assembly 188 of the present invention preferably is used to properly align axle/suspension system 180 in relation to vehicle frame 12 (FIG. 14). It is to be understood that, while reference herein is made to integral arm structure 182 of fourth embodiment axle/suspension system 180, alignment assembly 188 may be used to align an axle/suspension system structure of any similar type that attaches to a vehicle frame, including first embodiment axle/suspension system 40, second embodiment axle/suspension system 90 and third embodiment axle/suspension system 140, which are described above, and fifth embodiment axle/suspension system 260, which will be described below. Alignment assembly 188 secures the position of axle/suspension system 180 in a lateral direction, a fore-aft direction and a vertical direction, as will be described in detail below. Alignment assembly 188 includes a top alignment plate 222, a bottom alignment plate 224, a stepped eccentric cylinder 226 and a nut 228

In the prior art, an axle/suspension system typically is fixed in place after alignment with a clamp fastener that squeezes the components of the structure. However, integral arm structure 182 exhibits a tendency to creep under such clamping force. With particular reference to FIGS. 16 and 18, eccentric cylinder 226 engages corresponding orifices, to be described in detail below, which are formed in top alignment plate 222, upper plate 184 of integral arm structure 182 and bottom alignment plate 224. According to the present invention, stepped eccentric cylinder 226 eliminates the clamping style of the prior art by positively locking upper plate 184 of axle/suspension system integral arm structure 182 in place between top and bottom alignment plates 222, 224 to secure alignment of the integral arm structure in the lateral and fore/aft directions, as well as the vertical direction.

More particularly, top alignment plate 222 seats on top of upper plate 184 of integral arm structure 182 and contacts vehicle frame 12. A plurality of precisely-located bolt holes 230 are formed in top alignment plate 222 and align with corresponding holes formed in vehicle frame 12, providing alignment of the top alignment plate with the vehicle frame. Slotted bolt holes 186 formed in upper plate 184 and slotted holes 232 formed in bottom alignment plate 224 allow bolts (not shown) to secure top alignment plate 222, the upper plate of integral arm structure 182 and the bottom alignment plate together, with the upper plate of the integral arm structure sandwiched between the top and bottom alignment plates. Slotted holes 186 and 232 allow slight movement of upper plate 184 of axle/suspension integral arm structure 182 and bottom alignment plate 224 during the alignment process, thereby allowing proper alignment of the integral arm structure using eccentric cylinder 226.

To properly align integral arm structure 182, a laterally oblong orifice 234 is formed in an upper half of top alignment plate 222 and a fore/aft oblong orifice 236 is formed in a bottom half of the top alignment plate. Fore/aft oblong orifice 236 is smaller in circumference than laterally oblong orifice 234, thereby forming a lip 242 in top alignment plate 222 Stepped eccentric cylinder 226 includes a round shoulder 238 that corresponds to and is guided by the elongated sides of laterally oblong orifice 234 in top alignment plate 222, and an eccentrically situated round shoulder 240 that corresponds to and is guided by the elongated sides of fore/aft oblong orifice 236 in the top alignment plate. Stepped eccentric cylinder 226 is inserted into laterally oblong orifice 234 and fore/aft oblong orifice 236, whereby eccentrically situated round shoulder 240 respectively engages the elongated sides of the fore/aft oblong orifice, and round shoulder 238 respectively engages the elongated sides of the laterally oblong orifice and seats on lip 242. Eccentrically situated round shoulder 240 of eccentric cylinder 226 also passes through a corresponding round orifice 244 formed in upper plate 184 of integral arm structure 182 and a corresponding round orifice 246 formed in bottom alignment plate 224. A top surface 248 of stepped eccentric cylinder 226 lies flush with or slightly below a top surface 250 of top alignment plate 222 when assembled, ensuring that the top alignment plate makes flush contact with vehicle frame 12.

The position of integral arm structure 182 is adjusted by turning a hex shoulder 252 at the bottom of stepped eccentric cylinder 226. The oblong shape of orifices 234, 236, as well as the opposing orientation of round orifices 244, 246, allows stepped eccentric cylinder 226 to act as a guide pin to secure the position of integral arm structure 182 in both a lateral direction and a fore-aft direction. Nut 228, preferably a hex nut, is threaded onto stepped eccentric cylinder 226 and tightened when the desired position of integral arm structure 182 is reached. The tightening of nut 228 and respective nuts on bolts (not shown) that pass through holes 230, 186 and 232 secure alignment assembly 188 and the position of axle/ suspension system integral arm structure 182. In this manner, alignment assembly 188 provides a positive mechanical connection by virtue of the positive bearing surface of stepped eccentric cylinder 226. This connection, including the large surface area that it encompasses, results in a distribution of the forces that act on alignment assembly 188. Vertical alignment of axle/suspension system integral arm structure 182 preferably is accomplished by adjusting the thickness of top alignment plate 222.

Thus, alignment assembly 188 provides a simple, yet effective means for aligning axle suspension integral arm structure 182 with vehicle frame 12, while minimizing or preventing damage to the axle/suspension integral arm structure. It is to be noted that, while reference above has been made to particular shapes and orientations for orifices 234, 236, 244, 246 and corresponding cylinder shoulders 238, 240, these shapes and orientations are provided for reference only, as other orientations are contemplated by the present invention. In addition, one of top and bottom alignment plates 222, 224 may alternatively be eliminated, depending on the particular design requirements for alignment assembly 188. In such a case, lateral and fore/aft orifices 234, 236 are formed in the remaining top or bottom plate 222, 224. Moreover, lateral and fore/aft orifices 234, 236 can be formed in either top or bottom plate 222, 224 when both plates are present. Lateral and fore/aft orifices 234, 236 may optionally be replaced by a single orifice that is eccentric in two directions, which may employ a guide member.

Turning now to FIGS. 19-22, a fifth exemplary embodiment of the integral axle/suspension system of the present invention is shown attached to vehicle frame 12 and is indicated generally at 260. Fifth embodiment axle/suspension system 260 includes a pail of integral arm structures 262 which capture a conventional axle 28 and replace other components of prior art axle/suspension system 10 (shown in FIG. 1), including trailing arm beams 22, bushing assemblies 24 and frame hangers 18. Fifth embodiment axle/suspension system 260 preferably includes traditional axle central tube 30, axle spindle ends 32, air springs 34 and shock absorbers 36, while integral arm structures 262 serve as an alternative to traditional beams 22, hangers 18 and bushings 24. Components of brake system 48, while not part of axle/suspension system 180, are preferably mounted to integral arm structures 182 and are shown for the sake of completeness.

Figure 19:
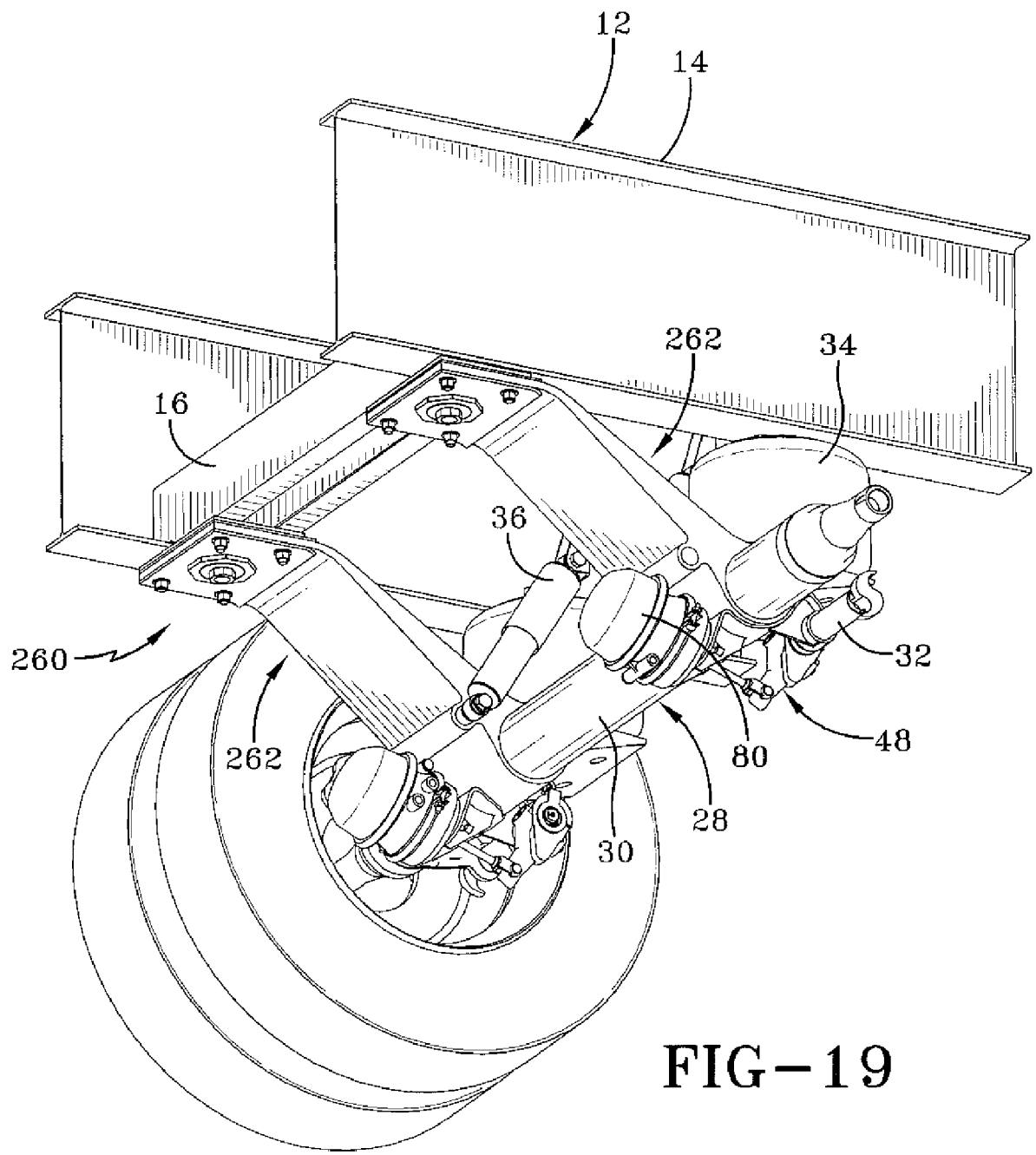
FIG. 19 is a bottom front perspective view of a fifth exemplary embodiment of the present invention shown connected to a heavy-duty vehicle frame, and further showing certain wheels of the vehicle and a brake system attached to the axle/suspension system.
Figure 20:
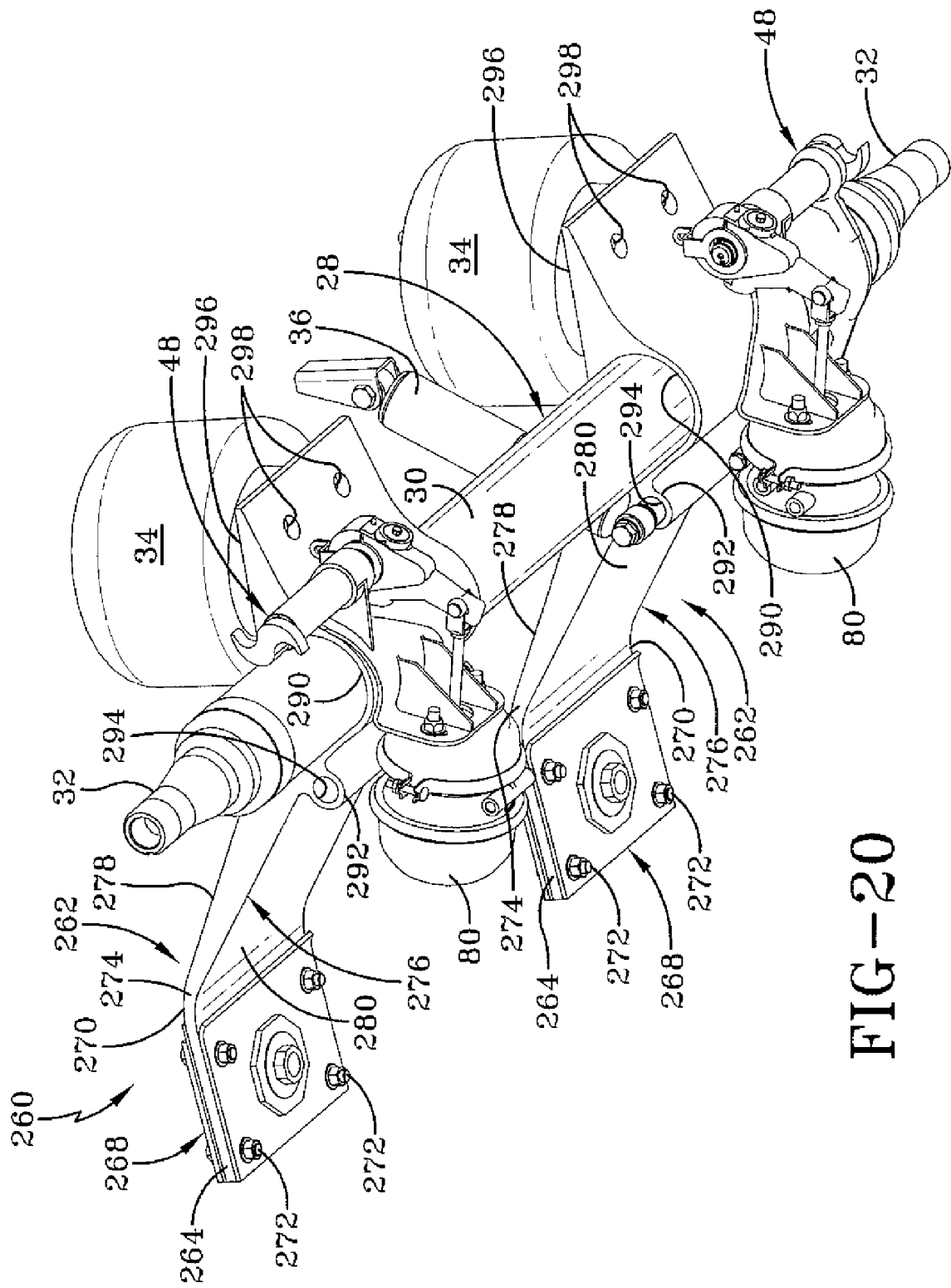
FIG. 20 is a bottom rear perspective view of the structure shown in FIG. 19, without the vehicle frame and wheels.

With specific reference to FIG. 19, integral arm structures 262 are mounted on main members 14 and selected cross members 16 of vehicle frame 12 in a transversely-spaced, rearwardly-extending or trailing, parallel manner. With additional reference to FIG. 20, each integral arm structure 262 includes a generally continuous, transversely-extending cross section which allows for the distribution of forces, as well as ease of manufacturing. Reference herein now will be made to a single integral arm structure 262 for simplicity, with the understanding that the description applies to both identical structures. An upper plate 264 is formed with holes 266 to allow axle/suspension system integral arm structure 262 to be fastened to vehicle frame 12 via fastening means such as bolts 272. Preferably, an alignment assembly, such as first embodiment alignment assembly 188 described above or a second embodiment alignment assembly 268, to be described in detail below, is used to provide proper alignment of integral arm structure 262.

Figure 21:
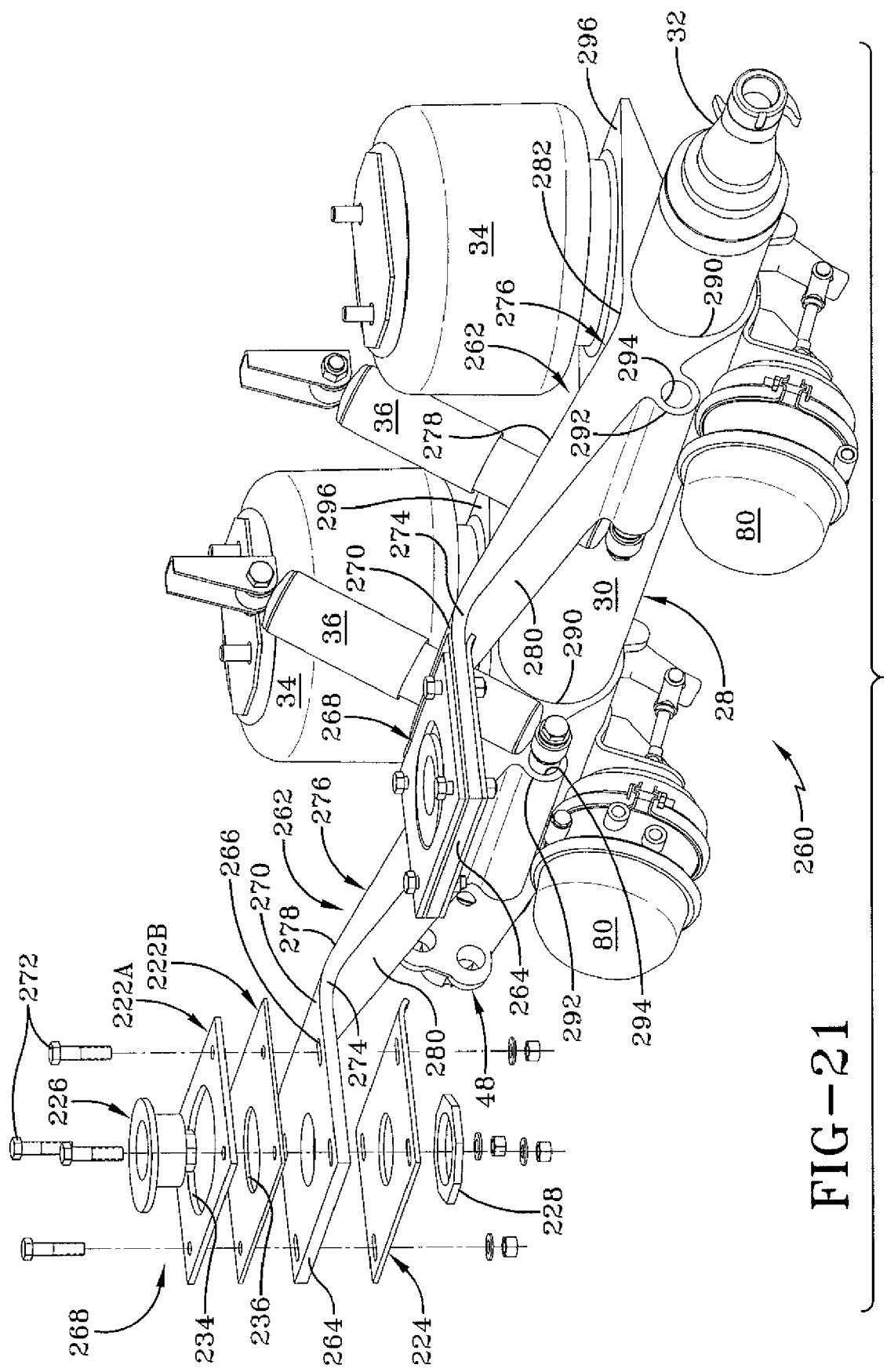
FIG. 21 is a side perspective view of the structure shown in FIG. 20, with a pair of second embodiment alignment assemblies, one of which is shown in exploded form and the other of which is shown in assembled form.
Figure 22:
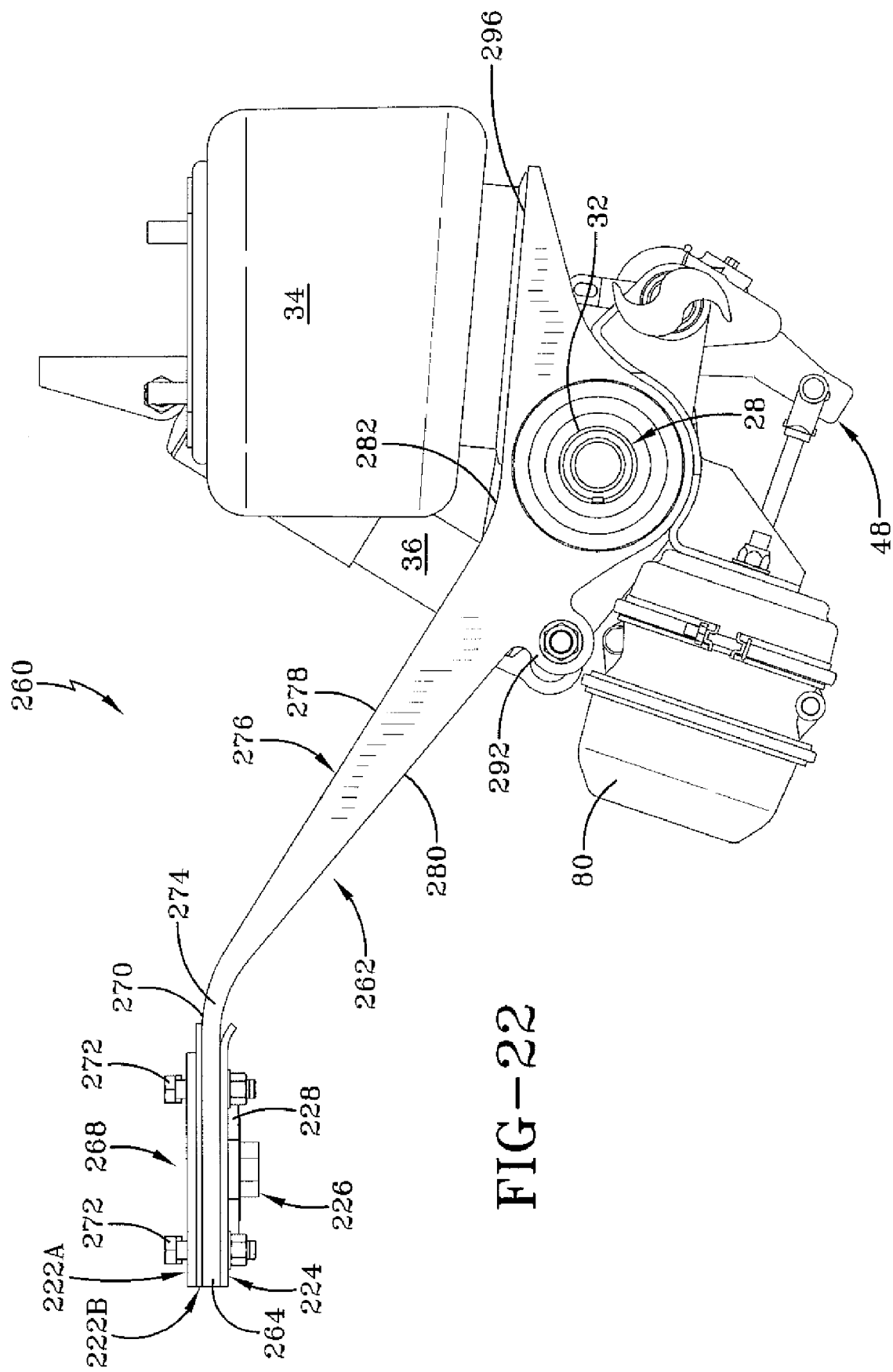
FIG. 22 is a side elevational view of the structure shown in FIGS. 20 and 21, with both second embodiment alignment assemblies shown in assembled form.

With additional reference to FIGS. 21 and 22, from a generally rearward edge 270 of upper plate 264, an angular transition member 274 curves rearwardly downward, preferably at an angle of from about 30 to about 70 degrees relative to horizontal, for a short distance to a rearwardly-extending body 276, which is generally solid. Body 276 initially extends rearwardly downward at approximately the same angle as angular transition member 274, that is, preferably from about 30 to about 70 degrees relative to horizontal. At a transition point 282, the rearwardly-downward extension of body 276 changes from its relatively steep angle of film about 30 to about 70 degrees to a less steep angle, such as an angle of from about 0 to 20 degrees relative to horizontal. Body 276 of fifth embodiment axle/suspension system 260 includes an upper surface 278 and a lower surface 280.

Body 276 is formed with an opening 290 for capturing axle 28. Axle 28 passes through opening 290 and is attached to body 276 by bonding the axle to the wall of the opening in the body, such as with an adhesive, and optionally using a bolt either alone or in combination with an adhesive. Axle 28 is thus substantially surrounded by body 276 and integral arm structure 262. Each spindle end 32 extends outboard from its respective proximate integral arm structure 262, and central axle tube 30 is disposed generally inboard from and between the integral arm structures. It is important to note that, while axle 28, including central tube 30 and spindle ends 32, of the prior art is described in conjunction with fifth embodiment axle/suspension system 260, the fifth embodiment of the invention may use other types of axles, such as an axle having a square cross-section, without affecting the overall inventive concepts.

Rearwardly of opening 290, body 276 tapers so that lower surface 280 angles upwardly to meet upper surface 278. Rearwardly of transition point 282, upper surface 278 of body 276 provides a table-like area 296 with sufficient size to mount components such as air springs 34, which extend upwardly from the body and ate mounted at their upper ends to vehicle frame main members 12. Openings 298 are preferably formed in body 276 to facilitate the mounting of air springs 34. It is to be understood that, while reference herein is made to various openings that are formed in integral arm structure 262, such forming may occur by machining the integral arm structure after its initial pultrusion or extrusion process, to be described below. Body 276 optionally also includes a protrusion 292 formed on lower surface 280. Protrusion 292 is formed with an opening 294 to facilitate the mounting of the lower end of shock absorber 36, which is mounted at its upper end to vehicle main frame member 12. Further openings (not shown) may be formed in members of integral arm structure 262, such as in body 276, to facilitate further mounting of and access to components of brake system 48, such as air chambers 80, and other components.

The combination of the angled portion of body 276 above transition point 282 and angular transition member 274 enables the angular transition member to flex while remaining structurally stable, enabling integral arm structure 262 to articulate in a pivotal motion during vehicle operation. In this manner, fifth embodiment composite axle/suspension system 260 replaces certain components of prior art axle suspension system 10 shown in FIG. 1, including frame hangers 18, bushing assemblies 24, and beams 22. Fifth embodiment axle/suspension system 260 finds specific application in areas where the use of generally solid body 276 is desirable. It is to be understood that generally solid body 276 may be applied to any of respective truss structure bodies 56, 106, 158, 196 of, respectively, first embodiment axle/suspension system 40, second embodiment axle/suspension system 90, third embodiment axle/suspension system 140, and fourth embodiment axle/suspension system 180, without affecting the overall concept or operation of the invention.

With reference now to FIGS. 21 and 22, second embodiment alignment assembly 268 preferably is used to properly align axle/suspension system 260 in relation to vehicle frame 12 (FIG. 19). It is to be understood that, while reference herein is made to integral arm structure 262 of fifth embodiment axle/suspension system 260, second embodiment alignment assembly 268 may be used to align an axle/suspension system structure of any similar type that attaches to a vehicle frame, including first embodiment axle/suspension system 40, second embodiment axle/suspension system 90, third embodiment axle/suspension system 140 and fourth embodiment axle/suspension system 180.

Second embodiment alignment assembly 268 is substantially the same in structure and operation as first embodiment alignment assembly 188, except that, rather than using a single top alignment plate 222 with a laterally oblong orifice 234 formed in an upper half of the plate and a fore/aft oblong orifice 236 formed in the bottom half of the plate (FIG. 16), the second embodiment assembly employs two separate top alignment plates, upper plate 222A and lower plate 222B. More particularly, upper top alignment plate 222A is formed with laterally oblong orifice 234, and lower top alignment plate 222B is formed with fore/aft oblong orifice 236. Second embodiment alignment assembly 268 also includes bottom alignment plate 224, stepped eccentric cylinder 226 and nut 228, just as first embodiment alignment assembly 188 does.

In this manner, second embodiment alignment assembly 268 secures the position of axle/suspension system 260 in a lateral direction, a fore-aft direction and a vertical direction in substantially the same way as described above for first embodiment alignment assembly 188. Second embodiment alignment assembly 268 finds particular application when it is more economical to manufacture two separate plates 222A and 222B, each having a respective one of laterally oblong orifice 234 and fore/aft oblong orifice 236 formed therein, rather than one plate 222 with both the laterally oblong and fore/aft oblong orifices formed therein, as described above for first embodiment alignment assembly 188.

With reference now to FIGS. 1-17 and 19-22, that is, to first embodiment 40, second embodiment 90, third embodiment 140, fourth embodiment 180, and fifth embodiment 260 of the integral axle/suspension system of the present invention, the invention includes an integral, one-piece integral arm structure 42, 92, 142, 182, 262 respectively, with a generally continuous cross section that provides for maximum distribution of forces encountered by the system. Upper plates 50, 94, 152, 184, 264 attach to a vehicle frame 12, and a transition member 54, 104, 156, 194, 274, respectively, extends between each upper plate and a corresponding body 56, 106, 158, 196, 276. Transition members 54, 104, 156, 194, 274 articulate and facilitate pivotal-like movement of integral arm structures 42, 92, 142, 182, 262, respectively, without the need for a frame hanger 18, bushing assembly 24 or a traditional trailing arm beam 22 as in prior art axle/suspension systems 10. Optionally, first and third embodiments 40, 140, may also replace prior art axle 28 having a tube 30

The height of integral axle/suspension systems 40, 90, 140, 180, 260 can be customized for a specific vertical ride height of a corresponding trailer by adjusting the respective thickness of upper plates 50, 94, 152, 184, 264, the length of respective transition members 54, 104, 156, 194, 274, or the dimensions of components of respective bodies 56, 106, 158, 196, 276. Optionally, other ride heights may be accommodated through the use of spacers, thus increasing the range of available ride heights.

Each integral arm structure 42, 92, 142, 182, 262 preferably has a substantially constant cross-section in a transverse direction relative to vehicle frame 12, that is, any cross section of each structure taken along a longitudinal or fore-aft line is substantially the same. Such a substantially constant cross-section enables each arm structure 42, 92, 142, 182, 262 to be a continuous pultruded or extruded shape made from a composite material, as known in the art, such as a fiber-reinforced composite, or a metallic material such as aluminum. More particularly, when integral arm structure 42, 92, 142, 182, 262 is made from a composite, the structure preferably includes a reinforcing material, such as glass fibers, carbon fibers, or other known reinforcing materials, which are resistant to tensile stretching. The fibers are dispersed in a polymeric or metallic matrix that is generally flexible, as known in the art of composite material design.

Preferably, integral arm structures 42, 92, 142, 182, 262 are pultruded, which involves pulling fibers, or a fiber-reinforcing material, through a resin bath and then through a die, as known in art of composite forming. More preferably, integral arm structures 42, 92, 142, 182, 262 are pultruded or pulled in a direction that is parallel to axle 28, 144. Pultrusion in this direction provides integral axle connection areas 72, 120, 172, 210, 290, the advantages of which will be described below. In addition, pultrusion in this direction is conducive to the orientation of the fibers in each integral arm structure 42, 92, 142, 182, 262 in a manner that provides transverse strength, or strength across the entire width of each structure. Such transverse strength in turn increases the transverse stability of each integral arm structure 42, 92, 142, 182, 262 and thereby improves the roll stability and/or force distribution of the structure and thus of each respective axle/suspension system 40, 90, 140, 180, 260.

More particularly, pultrusion of each integral arm structure 42, 92, 142, 182, 262 in a transverse direction, or in a direction parallel to axle 28, 144, enables the fibers in each respective structure to be oriented at an angle in a range of from about 0 to about 90 degrees relative to the fore-aft direction of the structure. It is to be noted that the fore-aft direction of each integral arm structure 42, 92, 142, 182, 262 is a direction that is generally perpendicular to axle 28, 144. Preferably, a selected percentage of the fibers in each integral arm structure 42, 92, 142, 182, 262 are oriented at an angle in a range of from about plus or minus 30 degrees to about plus or minus 60 degrees relative to the fore-aft direction of the structure. More preferably, a selected percentage of the fibers in each integral arm structure 42, 92, 142, 182, 262 are oriented at an angle of about plus or minus 45 degrees relative to the fore-aft direction of the structure, plus or minus a tolerance of about 15 degrees, which is desirable for optimum transverse strength and thus provides toll stability and/or force distribution for each respective axle/suspension system 40, 90, 140, 180, 260.

In addition, when each integral arm structure 42, 92, 142, 182, 262 is formed via pultrusion or extrusion, the connection of the structure to axle 28, 144 or axle spindles 44, 46 is improved over the prior art. More specifically, as described above, in prior art axle/suspension system 10 (FIG. 1), axle 28 typically is secured to each trailing arm beam 22 via a weld at beam-axle interface 26. Beam-axle interface 26, as with any connection point between an axle and a beam structure, is a high-stress point, as it experiences significant loads as the heavy-duty vehicle (not shown) travels over-the-load. The welds typically used in the prior art to secure axle 28 to trailing arm beam 22 create areas on the axle and on the beam that are known in the art as heat affected zones, which are areas that are adjacent the welds which have been weakened due to the heat associated with the welding process. These heat affected zones are stress risers, which are points of a structure that are more susceptible to stress due to weakness or discontinuity. Thus, when the vehicle travels over-the-road, these stress risers may cause premature failure of the structure at beam-axle interface 26, which in turn may reduce the life of prior art axle/suspension system 10. By forming an integral axle connection area 72, 120, 172, 210, 290 in each integral arm structure 42, 92, 142, 182, 262 via pultrusion or extrusion, and then bonding axle 28, 144 or axle spindles 44, 46 to the structure, the prior art welds are eliminated. Elimination of such welds in turn eliminates the stress risers caused by the welds, resulting in an axle connection for each integral arm structure 42, 92, 142, 182, 262 that is improved over the prior art.

Pultrusion and extrusion techniques known in the art may limit the ability to produce entire integral arm structures 42, 92, 142, 182, 262 in one piece. Thus, for example, a single piece including top truss plates 62, 112, 160, 198, and bottom truss plates 64, 114, 162, 200, respectively, or a portion of solid body 276, may be formed. Other truss members 66, 116, 166, 204, or the remainder of solid body 276, then may be bonded to the previously-formed piece to make integral integral arm structures 42, 92, 142, 182, 262 respectively. Furthermore, shoulders and mounting projections to attach various suspension system components, such as shock absorbers 36, and brake system components 48, such as cam shaft 132, to integral arm structures 42, 92, 142, 182, 262 optionally may be formed on each respective integral arm structure. Openings in these shoulders and projections to facilitate the mounting of components, as with any other openings in integral arm structures 42, 92, 142, 182, 262 are preferably formed or machined after the initial pultrusion or extrusion of the respective integral arm structure.

Axle/suspension systems 40, 90, 140, 180, 260 provide improved distribution of vertical, fore-aft, side-load and roll forces. Transition members 54, 104, 156, 194, 274 of integral arm structures 42, 92, 142, 182, 262, respectively, flex within the travel limits of their respective air springs 34 and shock absorbers 36, allowing pivotal-like articulation of the integral arm structures as in prior art systems 10, but without any discrete moving parts such as a compliant bushing 24, a pivot bolt, or the like. For example, for vertical forces, transition members 54, 104, 156, 194, 274 flex across their width, distributing the forces across a greater area, as opposed to isolating forces in bushing 24 of the prior art. In the case of roll forces, the forces impart a twisting "up-on-one-side, down-on-the-other-side" action to integral arm structures 42, 92, 142, 182, 262, and each respective transition member distributes these forces by reacting in a spring-like fashion, expanding in response to the "up-on-one-side" forces and compressing in response to the "down-on-the-other-side" forces.

The amount of force distribution and flexing is controlled by the thickness of transition members 54, 104, 156, 194, 274, and the design of the matrix of the composite in the transition members. The design of transition members 54, 104, 156, 194, 274, may take different forms, depending on the particular application and requirements. For example, curved transition members 54, 104 of first and second embodiments axle/suspension system 40, 90, respectively, are somewhat more flexible than angular transition members 156, 196, 274 of third, fourth and fifth embodiments axle/suspension system 140, 180, 260. Curved transition members 54, 104 therefore cushion vertical forces better than angular transition members 156, 194, 274, but in turn, the C-shaped transition members allow more fore-aft movement than the angular transition members. It is to be noted that, while curved transition members 54, 104 are shown as C-shaped, other curved shapes may be used, depending on specific design requirements.

Each respective body 56, 106, 158, 196, 276 cooperates with corresponding transition member 54, 104, 156, 194, 274 to provide rigidity, making integral arm structures 42, 92, 142, 182, 262 stable. For example, integral arm structures 42, 92, 142, 182, 262 are relatively rigid in the directions associated with trailer roll or sway, as compliance is established with flexible transition members 54, 104, 156, 194, 274 and corresponding bodies 56, 106, 158, 196, 276 provide stiffness to resist roll forces. Likewise, integral arm structures 42, 92, 142, 182, 262 are also rigid in the fore and aft directions to control brake loads and compliance steer effects The thickness of top truss plates 62, 112, 160, 198, the thickness of bottom truss plates 64, 114, 162, 200, the thickness of other truss members 66, 116, 166, 204, and the thickness of solid body 276, respectively, as well as the design of the matrix of the composite in these members, cooperate with the design of respective transition members 54, 104, 156, 194, 274 to control the amount of force distribution in corresponding axle/suspension systems 40, 90, 140, 180, 260.

Bodies 56, 106, 158, 196, 276 also provide large table-like surfaces 62, 112, 176, 216, 296 respectively, which facilitate the mounting of associated components, such as air springs 34, and further provide a vertical structural depth having strength to react to spindle/axle loads and to mount brake system components 48 and shock absorbers 36. In addition, the design of bodies 56, 106, 158, 196, 276, including truss members 66, 116, 166, 204, may take different forms, depending on the particular application and requirements. For example, truss structure-type bodies 56, 106 of first and second embodiments axle/suspension system 40, 90 respectively, are different in form from truss structure-type bodies 158, 196 of third and fourth embodiments axle/suspension system 140, 180, respectively, which are in turn different from solid-type body 276 of fifth embodiment axle/suspension system 260. The portion of bodies 158, 196, 276 of third, fourth and fifth embodiments axle/suspension system, 140, 180, 260 forward of respective transition points 164, 202, 282 is more steeply angled than the portion of these bodies rearward of the transition points. This configuration allows the portion of bodies 158, 196, 276 forward of transition points 164, 202, 282 to help corresponding transition members 156, 194, 274 distribute forces and establish compliance to a greater degree than the less-steeply angled bodies 56, 106 of first and second embodiments axle/suspension system 40, 90.

Another benefit of integral arm structures 42, 92, 142, 182, 262 is that each structure can be designed to be neutral at ride height, which is a term of art in the heavy-duty vehicle industry. That is, integral arm structures 42, 92, 142, 182, 262 can be designed to be neutral, or generally unstressed, when the trailer of a heavy-duty vehicle is loaded with flight and the axle/suspension system is maintaining vehicle ride height, which is the desired distance between the floor of the trailer and the road. More particularly, certain prior art suspension systems for heavy-duty vehicles use leaf springs instead of air springs 34, and thus able known as leaf spring suspensions. In some prior art leaf spring suspensions, composite materials have sometimes been used for the leaf springs, which must support the vertical load of the trailer of the heavy-duty vehicle to maintain the vehicle ride height. Since the leaf springs must support the weight of the trailer; the leaf springs experience stress even when the trailer is not yet loaded with freight. When the trailer is fully loaded with freight, the leaf springs therefore are highly stressed. Then, as a fully-loaded trailer travels over-the-road, potholes, curbs and other impact-related events are encountered, which input even more stress to the leaf springs, which may cause the composite material used in the leaf springs to delaminate, which is an internal structural separation of the composite, and is often considered in the art to be a structural failure of the leaf springs.

In contrast, integral arm structures 42, 92, 142, 182, 262 of axle/suspension systems 40, 90, 140, 180, 260, respectively, preferably are designed to experience stresses in a lower range than prior art leaf spring suspensions by being neutral, or generally unstressed, when the trailer is loaded with freight and the axle/suspension system is maintaining vehicle ride height. By being neutral at side height for a loaded trailer, integral arm structures 42, 92, 142, 182, 262 enable air springs 34 to provide optimum ride cushioning. Therefore, when the loaded trailer experiences impacts from traveling over-the-road, integral arm structures 42, 92, 142, 182, 262 experience relatively low stresses, which reduces the fatigue on each respective axle/suspension system 40, 90, 140, 180, 260. Such reduction of stress and fatigue extends the life of integral arm structures 42, 92, 142, 182, 262 and reduces the chances of delamination of the composite structures.

In addition, by preferably being formed of a composite material, integral arm structures 42, 92, 142, 182, 262 of axle/suspension systems 40, 90, 140, 180, 260, respectively, may distribute concentrated loads encountered by a heavy-duty vehicle in manner that is improved over prior art axle/suspension system 10.

First and third embodiments integral axle/suspension system 40, 140 of the present invention change the fundamental design of prior art axle/suspension systems 10 that rigidly attach to axle 28. These prior art axle/suspension systems 10 concentrated forces in the area of axle 28, causing the axle, with some assistance from associated components such as beams 22, to function as a large anti-roll bar, vertical beaming structure, fore-aft beaming structure and side load support structure. The single continuous cross-section of integral arm structure 42, 142 of first and third embodiments axle/suspension system 40, 140, respectively, instead establish compliance in a new way as they react the roll forces, fore-aft forces and side load forces in respective transition members 54, 156, and react the vertical beaming forces in respective bodies 56, 158. In addition, eliminating the hanger-trailing arm pivot connection made by hangers 18 and bushing assemblies 24 in prior art axle/suspension systems 10 reduces the potential for failure of components. Moreover, by extending transversely across a substantial portion of the width of the heavy-duty vehicle, first and third embodiments integral axle/suspension system 40, 140 enable the optional elimination of tube 30 of prior art axle 28, thereby desirably eliminating the weight and cost associated with the prior art axle tube.

Second, fourth and fifth embodiments axle/suspension system 90, 180, 260 provide a distribution of force that is somewhat less than that of first and third embodiments 40, 140, yet more than that of prior art system 10. That is, two separate integral arm structures 92, 182, 262 distribute force less than single integral arm structure 42, 142, but still provide an area of attachment to axle 28 and axle tube 30 which is increased over that of the prior art, and the use of respective transition members 104, 194, 274 and respective bodies 106, 196, 276 also act to provide increased distribution of forces, as described above.

Manufacturing costs of integral axle/suspension systems 40, 90, 140, 180, 260 are greatly reduced, as a single respective integral arm structure 42, 92, 142, 182, 262 can be extruded or pultruded in one continuous process and cut to length. In this manner, eliminating the labor and associated equipment for processes surrounding the fabrication and assembly of hangers, beams, brackets, bushings, pivot bolts, etc., leads to cost savings. Moreover, the reduction of components and areas that are joined with fasteners or through processes such as welding reduces the chances of failure at these joint areas, as described above. Because integral axle/suspension systems 40, 90, 140, 180, 260 are preferably made from a composite material, paint is unnecessary, contributing to lower manufacturing cost. Manufacturing problems also are reduced, as the elimination of metal parts that have to be welded together eliminates warping of the structure that is associated with welding.

In addition, because integral axle/suspension systems 40, 90, 140, 180, 260 are preferably made of a composite material, resistance to corrosion of the system is increased. Moreover, it is possible that weight savings may be achieved, depending on the design of the system and the specific materials used. As a result, heavy-duty vehicles, including tankers and certain flatbeds, which transport toxic waste or other corrosive materials, find the present invention very useful. Of course, the invention can be used on other types of heavy-duty vehicles.

While the invention has been described in the context of trailing arm axle/suspension systems, the invention also applies to leading arm axle/suspension systems. Moreover, the invention applies to heavy-duty vehicle frames that use non-movable subframes or movable sliders, and primary frames that do not use sliders.

The present invention has been described and illustrated with reference to specific embodiments. It shall be understood that this description and these illustrations are by way of example, and the scope of the invention is not limited to the exact details shown or described. Potential modifications and alterations may occur to others upon a reading and understanding of this disclosure, and it is understood that the invention includes all such modifications and alterations and equivalents thereof.

Accordingly, the integral axle/suspension system of the present invention is simplified, provides an effective, safe, inexpensive, and efficient system which achieves all the enumerated objectives, provides for eliminating difficulties encountered with prior art axle/suspension systems, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Having now described the features, discoveries and principles of the invention, the manner in which the improved axle/suspension system is constructed, arranged and used, the characteristics of the construction and arrangement, and the advantageous, new and useful results obtained; the new and useful structures, devices, elements, arrangements, parts and combinations, are set forth in the appended claims.

What is claimed is:

1. An axle/suspension system for a heavy-duty vehicle, said heavy-duty vehicle having a frame, said axle/suspension system including at least one air spring for cushioning the vehicle frame, at least one shock absorber for dampening axle oscillations, and a pair of axle spindles for mounting wheels of said vehicle, wherein the improvement comprises:
   at least one axle/suspension system integral arm structure, said integral arm structure being a generally continuous structure including:
   a) an attachment member for connecting said integral arm structure to said vehicle frame;
   b) a flexible transition member connected to and extending from said attachment member;
   c) a body connected to and extending from said transition member, said body including an axle mount; and
   d) said integral arm structure being free of a hanger for connecting the integral arm structure to said vehicle frame, and said integral arm structure being generally free of intervening structure for connecting said attachment member to said transition member and for connecting the transition member to said body, whereby said transition member enables articulation of said integral arm structure and cooperates with said body to distribute forces encountered by said axle/suspension system during operation of said heavy-duty vehicle.

2. The axle/suspension system for a heavy-duty vehicle of claim 1, whereby said at least one axle/suspension system integral arm structure distributes forces encountered by said axle/suspension system generally throughout said integral arm structure.

3. The axle/suspension system for a heavy-duty vehicle of claim 1, wherein said transition member of said at least one axle/suspension system integral arm structure provides substantial roll compliance for said axle/suspension system.

4. The axle/suspension system for a heavy-duty vehicle of claim 1, wherein said transition member of said at least one axle/suspension system integral arm structure is curved.

5. The axle/suspension system for a heavy-duty vehicle of claim 4, wherein said body includes a truss structure.

6. The axle/suspension system for a heavy-duty vehicle of claim 4, wherein said body includes a solid body.

7. The axle/suspension system for a heavy-duty vehicle of claim 4, wherein said at least one axle/suspension system integral arm structure is free of an axle tube.

8. The axle/suspension system for a heavy-duty vehicle of claim 4, wherein said at least one axle/suspension system integral arm structure includes two axle/suspension system integral arm structures extending in a parallel spaced manner and capturing an axle tube.

9. The axle/suspension system for a heavy-duty vehicle of claim 4, further comprising an alignment assembly for said axle/suspension integral arm structure, whereby the alignment assembly aligns said axle/suspension integral arm structure with said vehicle frame.

10. The axle/suspension system for a heavy-duty vehicle of claim 1, wherein said transition member of said at least one axle/suspension system integral arm structure is angular.

11. The axle/suspension system for a heavy-duty vehicle of claim 10, wherein said body includes a truss structure.

12. The axle/suspension system for a heavy-duty vehicle of claim 10, wherein said body includes a solid body.

13. The axle/suspension system for a heavy-duty vehicle of claim 10, wherein said at least one axle/suspension system integral arm structure is free of an axle tube.

14. The axle/suspension system for a heavy-duty vehicle of claim 10, wherein said at least one axle/suspension system integral arm structure includes two axle/suspension system integral arm structures extending in a parallel spaced manner and capturing an axle tube.

15. The axle/suspension system for a heavy-duty vehicle of claim 10, further comprising an alignment assembly for said axle/suspension integral arm structure, whereby the alignment assembly aligns said axle/suspension integral arm structure with said vehicle frame.

16. The axle/suspension system for a heavy-duty vehicle of claim 1, wherein said vehicle frame extends in a longitudinal direction, and said integral arm structure includes a substantially constant cross section in a transverse direction relative to said vehicle frame.

17. The axle/suspension system for a heavy-duty vehicle of claim 1, wherein said integral arm structure is formed of a fiber-reinforced composite material.

18. The axle/suspension system for a heavy-duty vehicle of claim 17, wherein said fibers are oriented at an angle between about 0 and about 90 degrees relative to a fore-aft direction of said integral arm structure.

19. The axle/suspension system for a heavy-duty vehicle of claim 18, wherein said fibers are oriented at an angle between about 30 and about 60 degrees relative to a fore-aft direction of said integral arm structure.

20. The axle/suspension system for a heavy-duty vehicle of claim 1, wherein said integral arm structure is neutral at a ride height of said vehicle when said vehicle is loaded with freight.

21. The axle/suspension system for a heavy-duty vehicle of claim 1, wherein said integral arm structure is free of hangers and bushings.

* * * * *